June 5, 1951  J. E. DAYGER ET AL  2,555,732
DUAL RECORD FEEDING DEVICE
Filed Jan. 26, 1949  17 Sheets-Sheet 1

INVENTORS
J. E. DAYGER
O. B. SHAFER
A. N. MILLER
BY J. W. Armbruster
ATTORNEY

June 5, 1951  J. E. DAYGER ET AL  2,555,732
DUAL RECORD FEEDING DEVICE
Filed Jan. 26, 1949  17 Sheets-Sheet 2
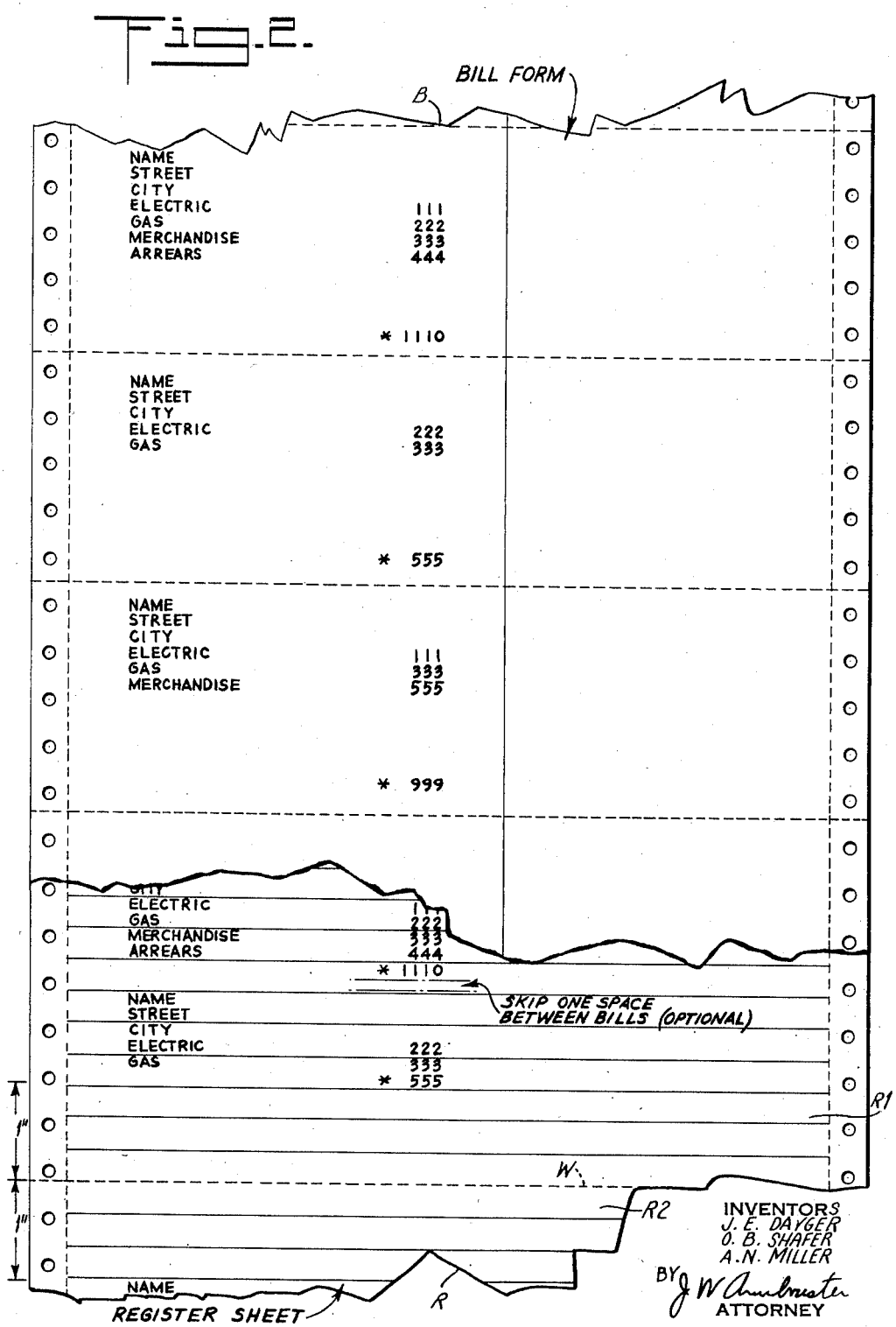

June 5, 1951  J. E. DAYGER ET AL  2,555,732
DUAL RECORD FEEDING DEVICE
Filed Jan. 26, 1949  17 Sheets-Sheet 3
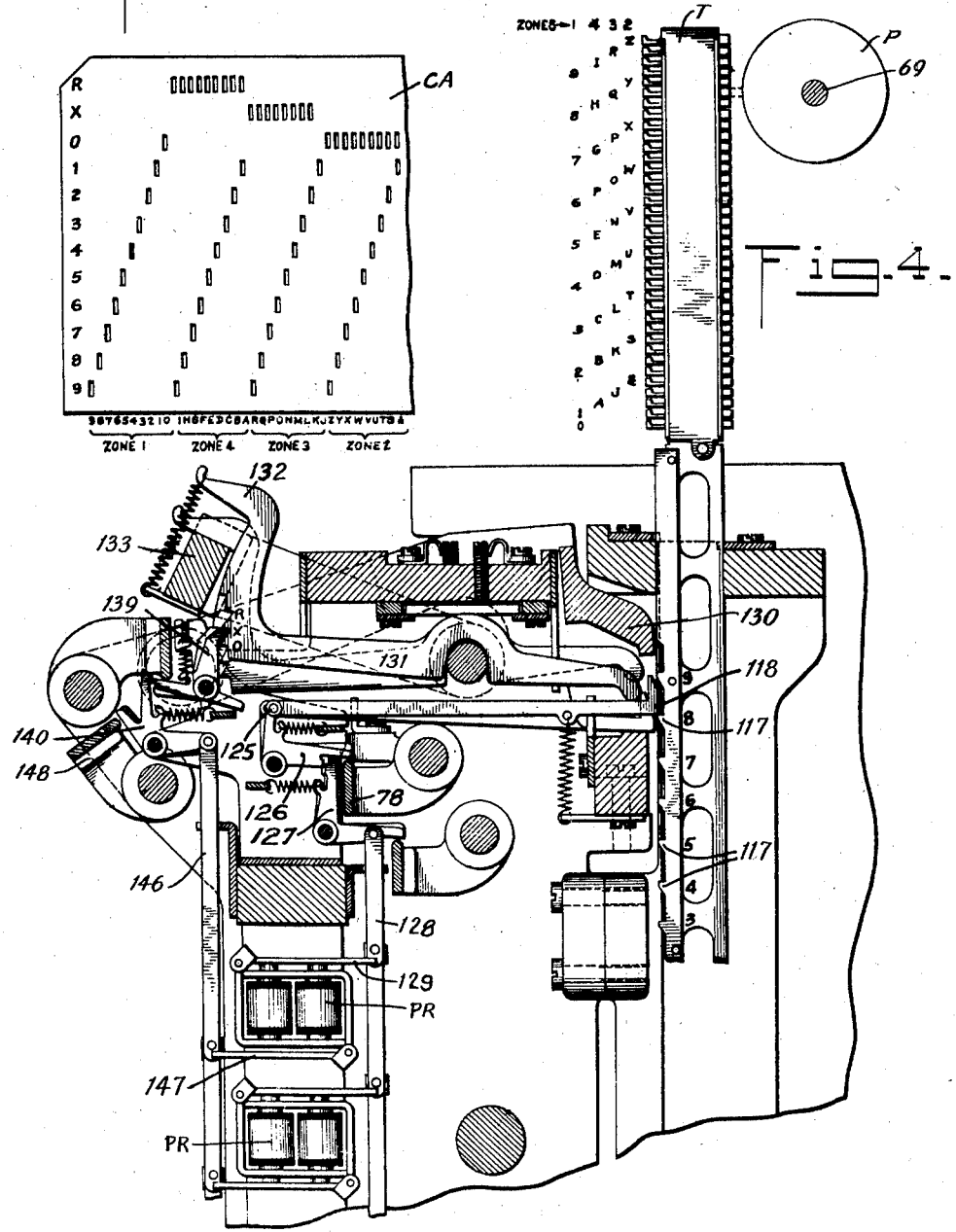
INVENTORS
J.E. DAYGER
O.B. SHAFER
A.N. MILLER
BY J W Armbruster
ATTORNEY June 5, 1951  J. E. DAYGER ET AL  2,555,732
DUAL RECORD FEEDING DEVICE
Filed Jan. 26, 1949  17 Sheets-Sheet 4

INVENTORS
J. E. DAYGER
O. B. SHAFER
A. N. MILLER
BY J. W. Armbruster
ATTORNEY

June 5, 1951  J. E. DAYGER ET AL  2,555,732
DUAL RECORD FEEDING DEVICE
Filed Jan. 26, 1949  17 Sheets-Sheet 5

INVENTORS
J.E. DAYGER
O.B. SHAFER
A.N. MILLER
BY J W Armbruster
ATTORNEY

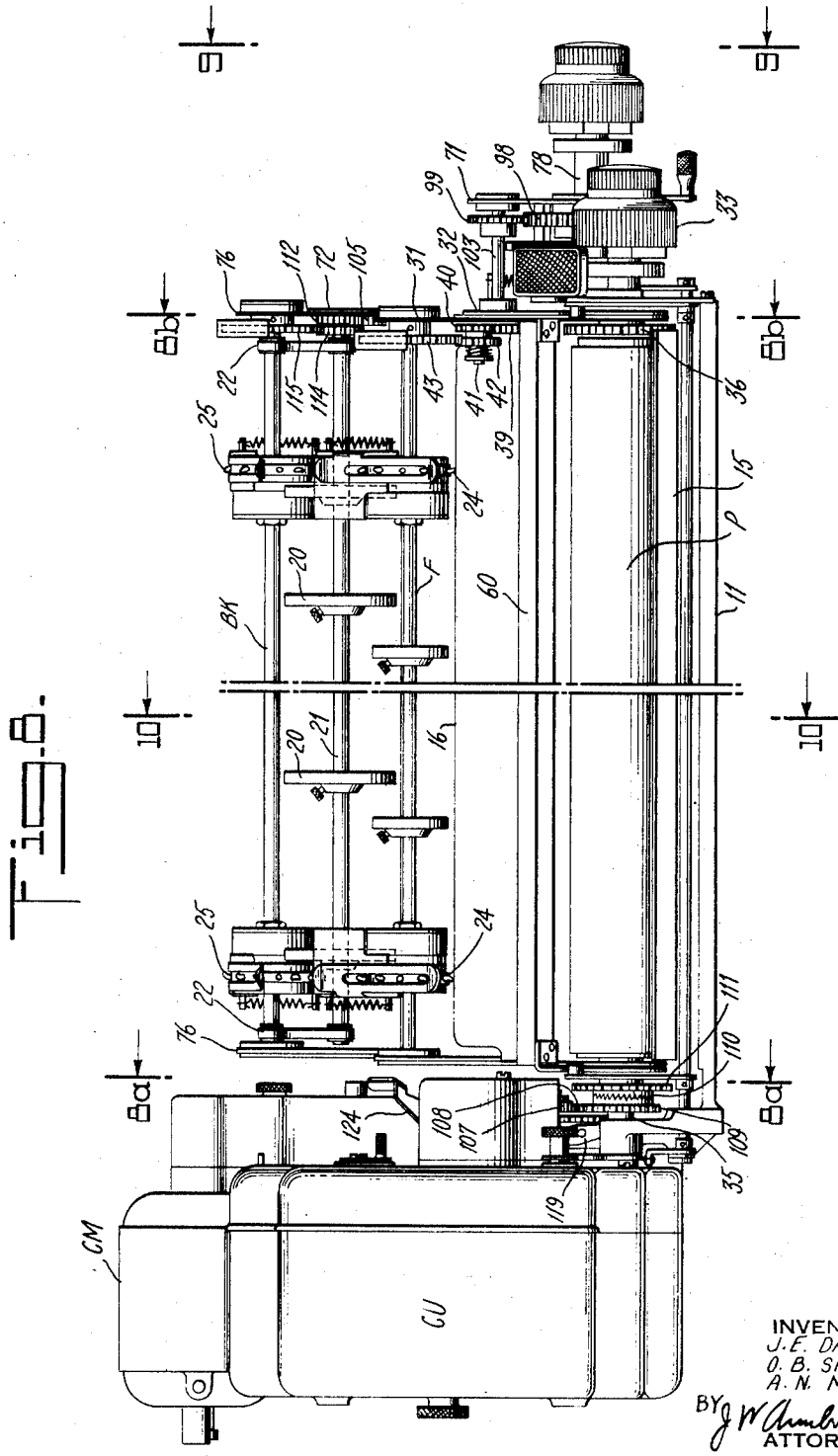

June 5, 1951 J. E. DAYGER ET AL 2,555,732
DUAL RECORD FEEDING DEVICE
Filed Jan. 26, 1949 17 Sheets-Sheet 7

INVENTORS
J. E. DAYGER
O. B. SHAFER
AN. MILLER
BY J. W. Armbruster
ATTORNEY

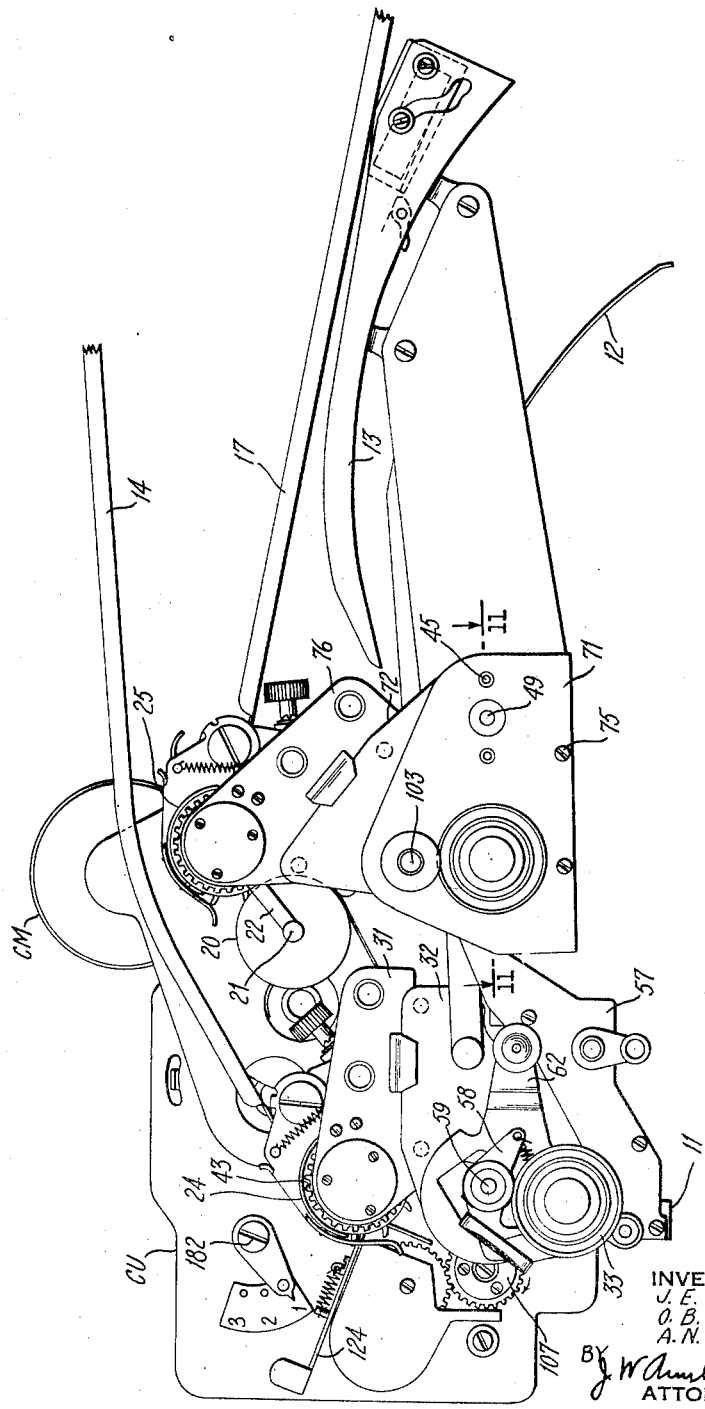

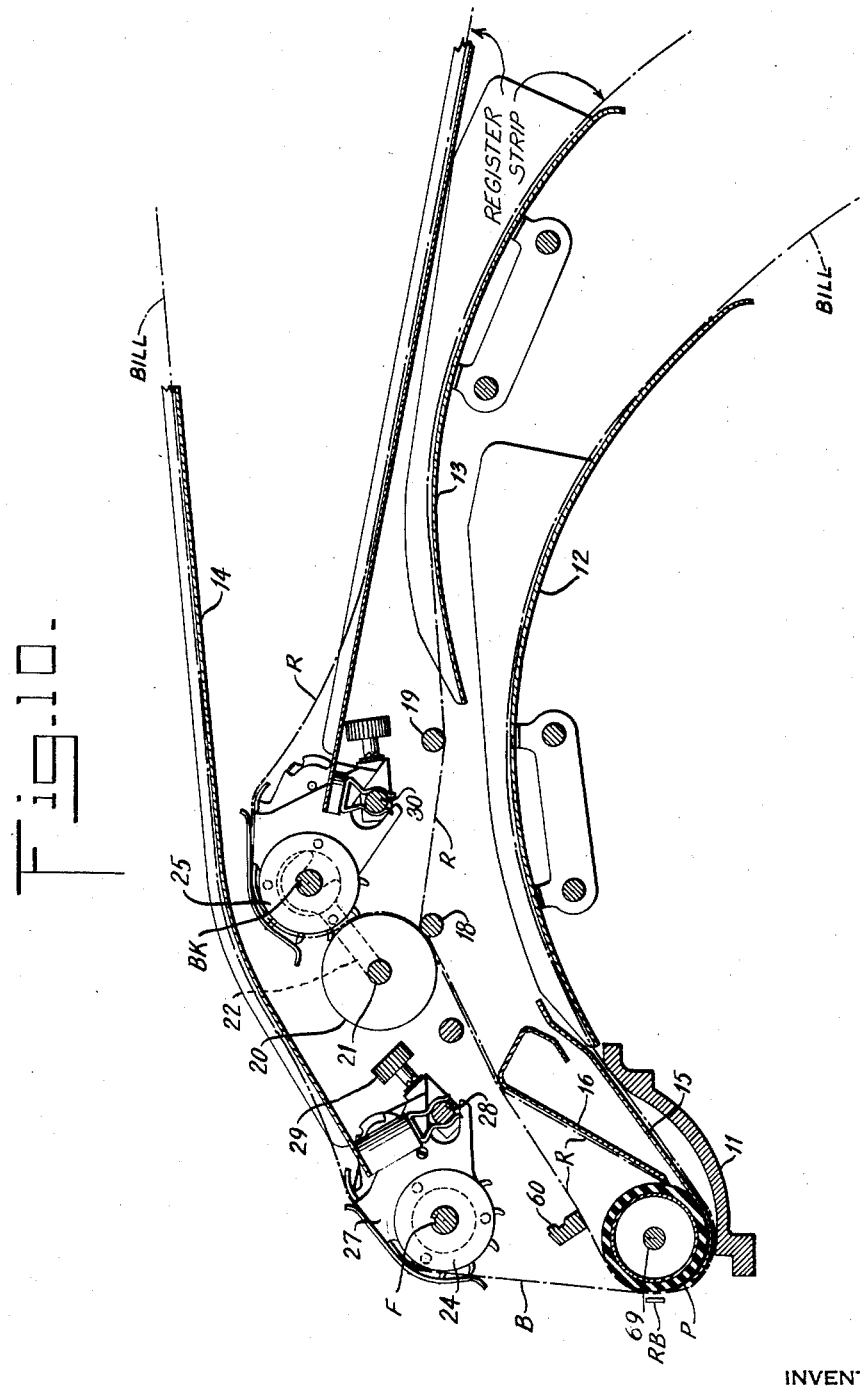

June 5, 1951

J. E. DAYGER ET AL 2,555,732

DUAL RECORD FEEDING DEVICE

Filed Jan. 26, 1949

INVENTORS
J. E. DAYGER
O. B. SHAFER
A. N. MILLER
BY J. W. Armbruster
ATTORNEY

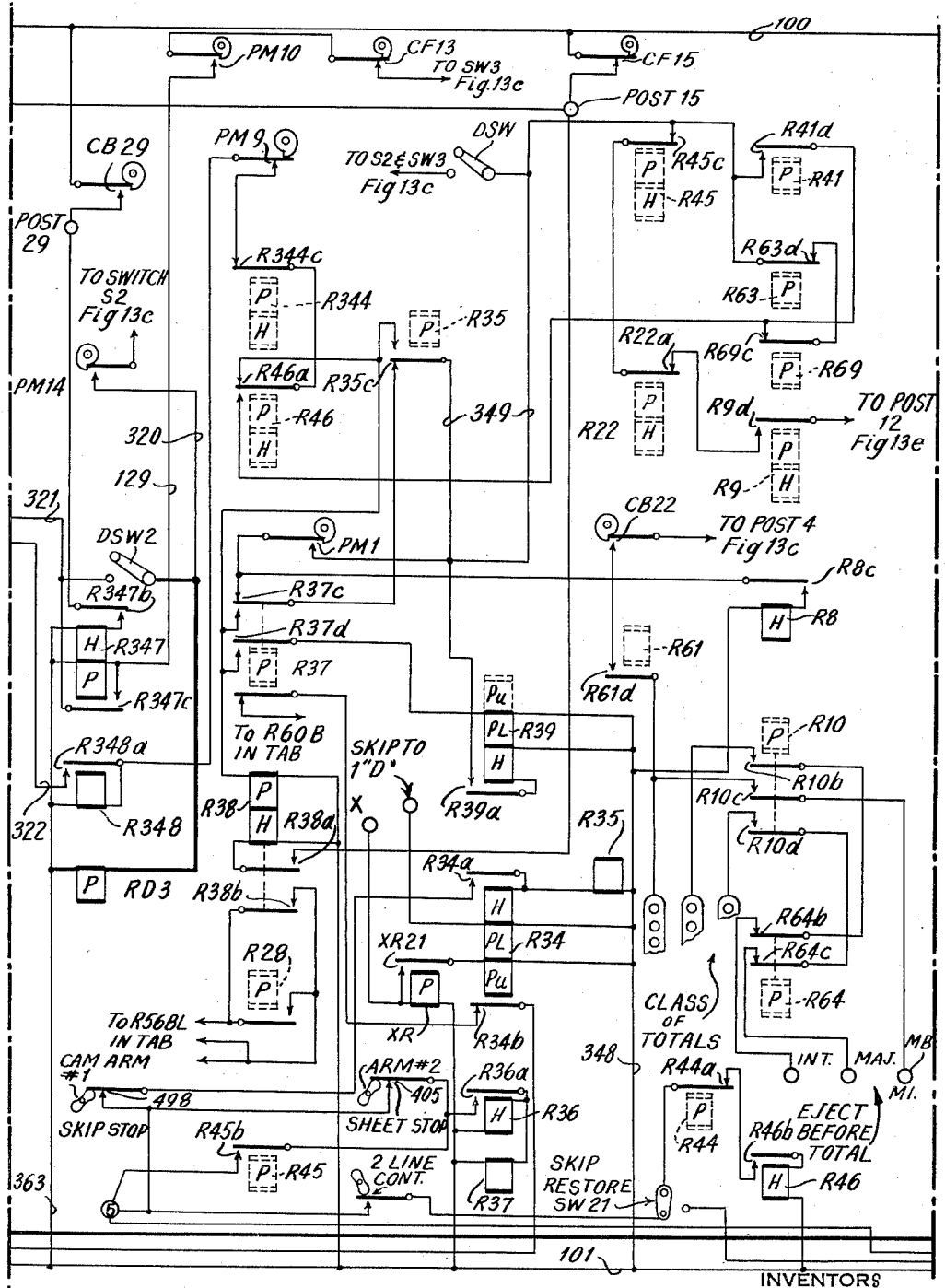

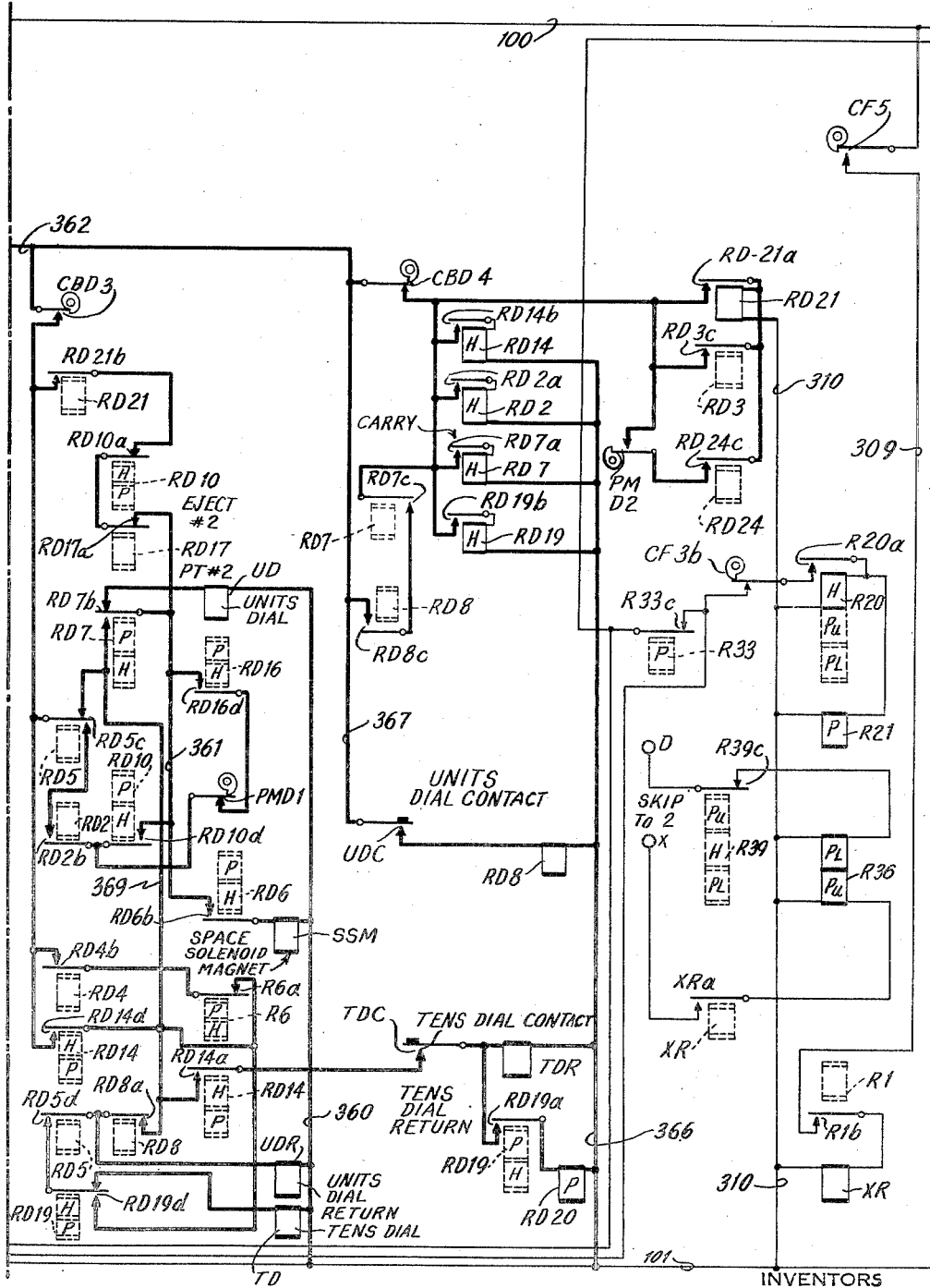

June 5, 1951   J. E. DAYGER ET AL   2,555,732
DUAL RECORD FEEDING DEVICE
Filed Jan. 26, 1949   17 Sheets-Sheet 16

INVENTORS
J. E. DAYGER
O. B. SHAFER
A. N. MILLER
BY J. W. Armbruster
ATTORNEY

Patented June 5, 1951

2,555,732

UNITED STATES PATENT OFFICE 2,555,732

DUAL RECORD FEEDING DEVICE

Jonas E. Dayger, Binghamton, and Orville B. Shafer, Owego, N. Y., and Asa N. Miller, Hallstead, Pa., assignors to International Business Machines Corporation, New York, N. Y., a corporation of New York Application January 26, 1949, Serial No. 72,892

8 Claims. (Cl. 197—133)

This invention relates generally to improvements in record control machines and more particularly to dual record feeding controls in such machines.

An object of the invention is to provide a simplified and yet flexible control for printing condensed duplicate register sheets while printing original bills, checks, etc. Both record mediums are continuous strips, one divided into register sheets and the other divided into bill forms. In the printing of such bills, checks, etc., it is required that rather long spacing be made between the last item line and the total and also between the last printed line of one check and the first printed line of the following check. This is done because of the regular size of such instruments with spaced blocks for address, item and total printing and a capacity for taking more than the usual number of lines of print. An exact duplicate of such printing would be wasteful of record material when it is desired that only the recordings be duplicated without relation to spacing. Therefore, when the original record strip is space skipped or ejected with a long feeding operation, the second or register strip is merely advanced one line space.

Another object of the invention is the provision of dual feeding controls, one part of which is devoted to adjusting a condensed billing register strip so that said strip may be subdivided into sheets of convenient length whereon the condensed billing information is spaced in from the top and bottom of each sheet but closely arranged within the body of each sheet. According to the invention, a pair of step switches or units and tens stepping relays are provided to give a range of preselected register sheet lengths up to 99 line spaces wherein the settings may be made for sheets of any length and spaces of varying extent at the top and bottom of such sheets.

Another object of the invention is the provision of a solenoid operated line spacing mechanism, said mechanism being used to feed the register strip and coordinated with the stepping relays already mentioned when they are advanced as an indication of the extent or length of a register sheet in use, and also coordinated with the feeding controls of an automatic carriage of the kind disclosed in Patent No. 2,189,025, said carriage being used to control the line spacing and long feeding of the bill form strip.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 2 shows sample portions of the bill strip and the register strip, the former being divided into bill sections and the latter being arranged with lines of weakness between register sheets.

Fig. 3 shows the portion of a control record as it is perforated in code to represent the various digit and alphabet data.

Fig. 4 is a sectional elevation view showing the numeral and alphabet printing mechanism.

Fig. 8 is a front elevation view showing the platen with the automatic carriage arranged at the left side and two sets of pin wheels arranged above the platen.

Fig. 9 is a side elevation view showing the frames for the dual feeding controls.

Fig. 10 is a sectional elevation view taken along the line 10—10 in Fig. 8 and showing the paths followed by the two record strips in passing around the platen and over the separate pin feeding devices.

Figs. 13a to 13g, when taken together, form a wiring diagram of the pertinent portions of the alphabet tabulating machine and automatic carriage, with the special control wiring shown in heavy lines.

The feeding controls are illustrated in coordination with a record controlled alphabet printing tabulator. The printing machine is of the kind shown in Patents Nos. 2,079,418 and 2,111,122 and application Serial No. 609,354, filed on August 9, 1945, and now Patent No. 2,531,885, dated November 28, 1950, and application Serial No. 32,568, filed on June 12, 1948, and now Patent No. 2,528,427, dated October 31, 1950, wherein mechanisms are shown for feeding record cards one by one and analyzing the cards electrically to control the setting of type bars and the accumulation of amounts and total printing of such amounts. The automatic strip feeding carriage is of the kind described in detail in Patent No. 2,189,025.

Figure 1:
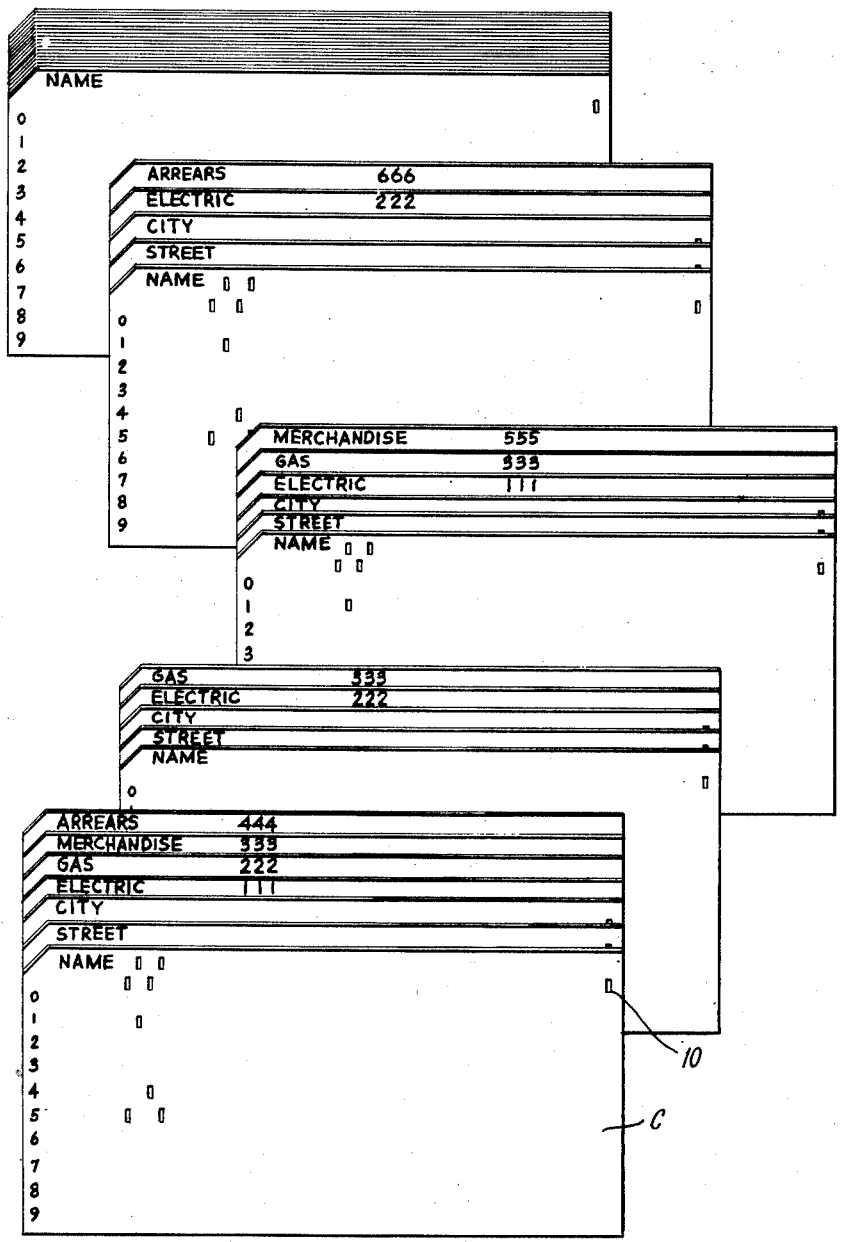
Fig. 1 shows five sets of perforated record cards arranged in groups related to different bills to be printed by the machine.

In the printing of bills on a continuous strip, control is exercised by a sequence of record cards arranged to print alphabetic heading data such as names, addresses, dates, in combination with other detail cards perforated to represent items and amounts to be recorded, accumulated, totalled and charged to the various customers. A few such sequences of cards are shown in Fig. 1 and the cards there represented are used to control the printing on three successive bill forms B, such as those shown in Fig. 2. On the register sheet R1 the first two bills are duplicated with condensed spacing and then a 1" space is skipped on each side of the line of weakness W on the register strip. In order that variations may be made in the length of the register sheets and the blank areas thereon, the present devices are flexible to the extent that any sheet length up to 99 lines may be made with any amount of spacing top and bottom.

Referring back to the cards in Fig. 1 and reading them from the bottom to the top, it is noted that they coincide in number with the lines of recordings on the bills in Fig. 2. Then it is also noted that all heading cards are distinguished from the detail cards by X punchings identified by the reference numeral 10. As a further distinction between the different sets of cards, the usual group control perforations are employed as by a customer's account number.

The heading name and address cards (Fig. 1) bear alphabet indicia in the form of code perforations. These perforations are sensed by the lower brushes of the tabulator and directed into print control magnets to control the recording of names and addresses.

The code arrangement of the perforations in the record card will first be explained. Referring to Fig. 3, the diagrammatic record card CA has the usual perforations for indicating numerical values as shown at the left side of the card. The alphabetical characters from A to I are combinations of one of the numerical characters from 9 to 1, plus a perforation in the R index point position. The characters J to R each comprise a perforation in one of the numerical positions 9 to 1, plus a perforation in the X index point position. The remaining letters of the alphabet, namely S to Z, each comprise a combination including one of the perforations 9 to 2, plus a perforation in the 0 index point position.

It may be mentioned that, as the address cards pass under the lower brushes and differentially timed impulses are initiated, these impulses are carried to control magnets and used to position alphabet print bars as about to be explained with reference to mechanism similar to that shown in Patent No. 2,111,122.

In Fig. 4 is shown an alphabet type bar T which is provided with a plurality of type elements upon which the digit and alphabet characters are arranged as indicated. For the purposes of explanation, the various characters are arranged and labeled in accordance with a particular zone. Thus, the digits are included in zone 1; the letters S to Z in zone 2; J to R in zone 3; and A to I in zone 4. Reference to Fig. 3 reveals that the letters I, R and Z each contain a perforation in the 9 index point position, but have a different zone perforation R, X and 0. Similarly, the letters H, Q and Y each contain the perforation 8 and a different zone perforation.

The type bar T is arranged to be moved to pass the printing position opposite platen P in synchronism with the movement of the card past the lower brushes and, as the 9 index point positions traverse the brushes, the Z type element will be approaching the printing position; as the 8 index point positions traverse the brushes, the Y type element will be approaching the printing position, and so on.

Each type bar T is provided with a series of teeth 117 which are labeled 9 to 0 and which represent corresponding index point positions on the record card. As the type bar is moved upwardly the teeth 117 move to pass a stopping element 118. The element 118 is pivoted at 125 to a bell crank 126 which is normally held in the position shown by a bell crank latch 127 which has connection through a link 128 to the pivoted armature 129 of print control magnet PR.

Upon the energization of magnet PR in response to the sensing of a digit perforation, armature 129 will be rocked clockwise, drawing downwardly on link 128 to cause clockwise rocking of latch 127 to release bell crank 126 whose spring will thereupon shift the stopping element 118 toward the right into the path of the tooth 117 corresponding to the perforation whose sensing caused energization of the magnet. Further upward movement of the type bar is thus interrupted at this time. The stopping element 118 is held against upward movement by a bail 130 which later, as the zone holes are sensed, rocks counterclockwise to permit resumption of the upward movement of the type bar. During such movement, the element 118 may be stopped by a lever 131 which loosely straddles a rod and has its upper curved edge held down by a bar. The left end of the lever has an extension 132 resting upon a bail 133 which occupies a raised position during the analysis of the digit representing positions of the card. The member 131 is provided with three teeth which, under control of the bail 133, move downwardly to pass the toe of a stopping pawl 139 during the time that the zone perforations 0, X and R pass the brushes LB. The pawl 139 is normally held with its toe out of the path of the teeth by a bell crank latch 140 which has a link connection 146 with the lower armature 147 of magnet PR.

Extending across the latches 140 is a bail 148 which occupies a raised position during the sensing of the digit positions, preventing tripping of these latches during this portion of the sensing operation. However, while the zone perforations are passing the brushes the bail 148 is rocked slightly counterclockwise so that an energization of magnet PR, due to the sensing of a zone perforation, will rock its armature 147 clockwise to elevate link 146 and rock bell crank 140 counterclockwise to release pawl 139 which will engage the first tooth 0 if the zone hole is at the zero position; the second tooth X, if it is in the X index position; or the third tooth R if it is an R hole. If no zone hole is present, the lever 131 will rock an additional step to cause an upper shoulder to engage the pawl 139. From the foregoing it is apparent that the alphabet printing bars can be stopped as governed by the address code perforations on the name and address cards, so that various words are spelled and recorded at the printing line.

The platen P does not use the usual pressure rollers but is merely a striking piece for the type because in this case both record strips are advanced by pin feed devices.

The foregoing portions of the description are concerned mainly with the controls of the regular printer. The following section deals with the parts of the automatic carriage of Patent No. 2,189,025 used to line space and eject the bill forms.

A bracket 141 (Fig. 7) projecting from the carriage frame 134, forms a bearing for the shaft 142 of the carriage motor CM. A pinion 143 on the motor shaft 142 meshes with a gear 144 pivoted on a stud 145 on the side of bracket 141. Attached to gear 144 is a smaller gear 135 in mesh with a gear 136 keyed on the shaft 137. On the side of gear 136 (Fig. 5) is secured a gear 93 in mesh with an idler gear 94. The driving train of connections continues through gear 94 meshing with another idler gear 95 which in turn drives a gear 96 fastened to the line spacing drive shaft 151. The gear connections just traced form a constantly running train from motor shaft 142 to line spacing drive shaft 151. Other gearing, also outside the frame 134 with the line space drive, forms a selective two-speed drive for the ejection mechanism described hereinafter.

Figure 5:
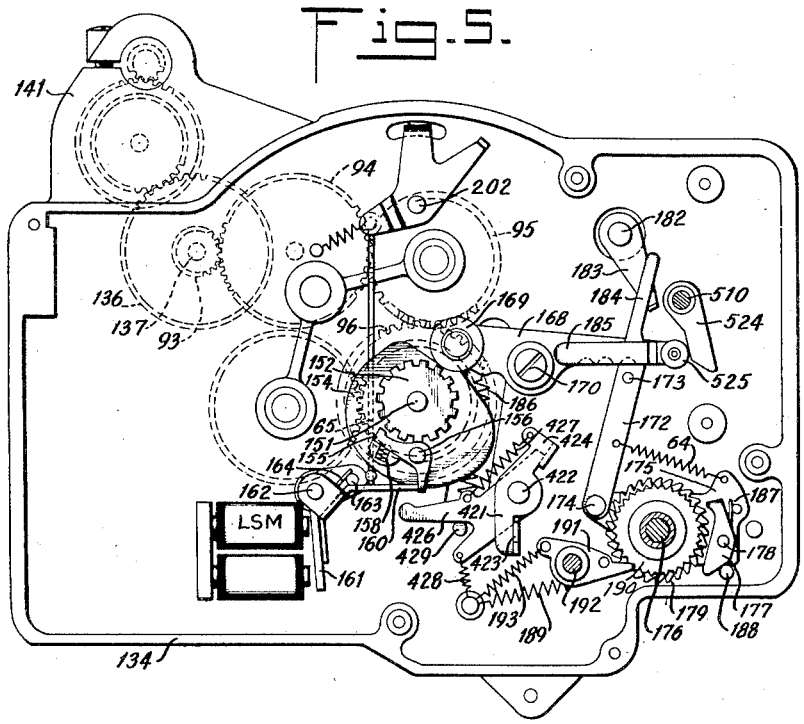
Fig. 5 is an elevation view of the line space control mechanism in the automatic carriage.

Continuing tracing the line spacing drive, reference to Fig. 5 shows that shaft 151 carries a clutch plate 152 attached thereto. Adjacent the toothed plate 152 is a cam 154 loosely pivoted on shaft 151. This cam carries a clutching pawl 155 pivoted at 156. A compression spring 158 mounted in a stud on cam 154 tends to engage pawl 155 with clutch plate 152, but an extending tail on the pawl is normally obstructed by the end of an armature lever 160 connected to the armature 161 of a line spacing control magnet LSM. The lever 160 is pivoted on a stud 162 and is urged in a counterclockwise direction against stop pin 163 by a spring 164.

When the line spacing magnet LSM is energized, the armature lever 160 is rocked in a clockwise direction, releasing the clutch pawl 155 which then engages the clutch plate 152, thus connecting the cam 154 to the driving shaft 151. As the cam 154 rotates it operates a lever 168 through a roller 169 on the lever in cooperation with the periphery of the cam. The lever 168 is pivoted on a stud 170 and is provided with an extending arm which is cut to form three notches. A link 172, placed adjacent the lever 168, carries a pin 173 adapted to cooperate with any one of the three notches in lever 168. The other end of link 172 is pivotally connected at 174 to a line spacing plate 175 loosely mounted on the platen feed and line space shaft 176. The plate 175 carries a feed pawl 177 pivoted at 178 on the plate and adapted to cooperate with a ratchet gear 179 fixed to shaft 176. This shaft is secured to a gear 107 (Fig. 6) and is thereby adapted to turn the platen shaft through an idler gear 108 and a gear 109 fastened to the platen shaft 69.

From the connections mentioned it may be noted that as the cam 154 (Fig. 5) is rotated, the lever 168 is rocked in a clockwise direction, pushing link 172 down and rocking the plate 175 so that pawl 177 advances the platen feed shaft 176 one or more steps in a counterclockwise direction. The amount of motion imparted to the bill feed shaft is determined by the adjustment of the end of link 172 so that pin 173 cooperates with any one of the three notches in lever 168. If the pin cooperates with the notch nearest the pivot of the lever, the motion imparted will amount to one line space. When the link is lifted to cooperate with the center notch the motion carried to the platen amounts to two line spaces. Swinging the link to the right and the highest position, causes cooperation with the end notch in lever 168 and connects the line spacing devices to produce three steps of feed.

The manual adjustment of link 172 is brought about by means of a manipulated arm 183 extending inside the carriage frame 134. The arm is connected to an outside knob with a plunger which the operator may set to hold the arm in any one of three positions identified on the side of the frame. A shaft 182 is connected to the outside knob and has secured thereon arm 183 with a tab 184 cooperating with the side of link 172. By means of these connections the link 172 is swung to a space selecting position by arm 183. A spring 186 urges the lever 168 in a counterclockwise direction and tends to hold roller 169 against cam 154. Link 172 is held in constant cooperation with tab 184 by means of a spring 64.

A spring 187 wound around stud 178 tends to move pawl 177 into cooperation with ratchet 179. However, in the normal position of the parts, a cam face on the lower portion of pawl 177 cooperates with a stud 188 projecting from the frame 134 in such manner that the pawl is forced away from the ratchet. The same stud 188 serves as a stop for the plate 175 when it is drawn to the home position by a spring 189.

Secured to the side of ratchet 179 is a star wheel 190 provided for the purpose of normally preventing backward movement of the platen drive shaft 176. Cooperating with the star wheel 190 is a pawl 191 loosely pivoted on shaft 192 and held into cooperation with the star wheel by spring 193.

In addition to the described line spacing connections to the platen drive shaft 176, other devices are provided to long feed or eject the bill record for wide spacing. Many of the gears previously mentioned, namely; gears 144, 135, 136, 93, 94, 95, and 96 (Figs. 5 and 7) are used in ejecting as well as in line spacing. Attached to gear 96 (Fig. 5) is a gear 65 meshing with a gear 66 keyed to a shaft 67. This shaft 67 is similar to the other shaft 137 (Fig. 7) in that it may be moved axially to place a pinion 87 thereon in and out of mesh with an eject drive gear 68. The other shaft 137 terminates in a similar pinion 88. Shaft 137 operates at a higher rate of speed than shaft 67, because the former is geared almost directly to drive pinion 143 while the latter is driven through a train of gearing involving two speed reductions between gears 93, 94, and 65, 66. The machine operator may choose the speed of record ejection according to the distance or space to be ejected. For spaces less than 3½ inches it is advisable to use the high speed train of ejection gearing, while for all longer lengths the low speed train should be used. A detailed showing of the change speed gearing is disclosed in Carroll Patent No. 2,189,025.

Figure 7:
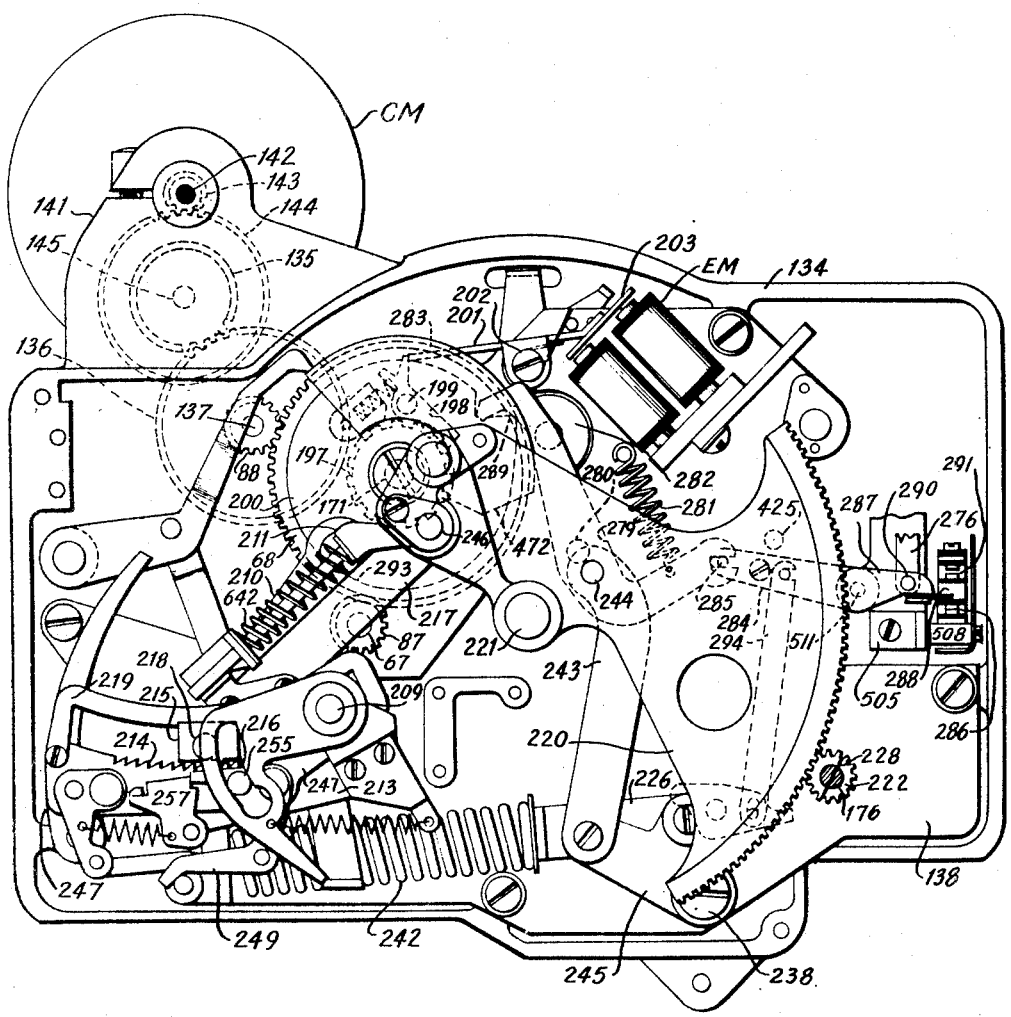
Fig. 7 is an elevation view of the mechanism for controlling ejection of the bill form by the automatic carriage to move it from form to form with a long feeding operation.

The ejection driving connections continue through a clutch which may be connected at any time in the operation of the machine to cause a form ejection operation. The driving member of the clutch is the gear 68 driven by either of the pinions 87 or 88, previously mentioned. Referring to Fig. 7 it is noted that gear 68 is pivoted on stud 171 in frame 134 and carries attached thereto a toothed clutch plate 197. Loosely pivoted on the same stud 171 is an ejection cam plate 200. Pivoted on the side of cam 200 is a pawl 198 on stud 199. The pawl is in alignment with clutch plate 197 but is normally held out of engagement therewith by an armature lever 201 abutting against an extending tail on the pawl. The lever is pivoted at 202 and attached to an armature block 203 associated with an ejection control magnet EM.

When the magnet EM is energized, lever 201 is rocked in a clockwise direction, releasing pawl 198 and clutching cam plate 200 to the driving gear 68.

Figure 6:
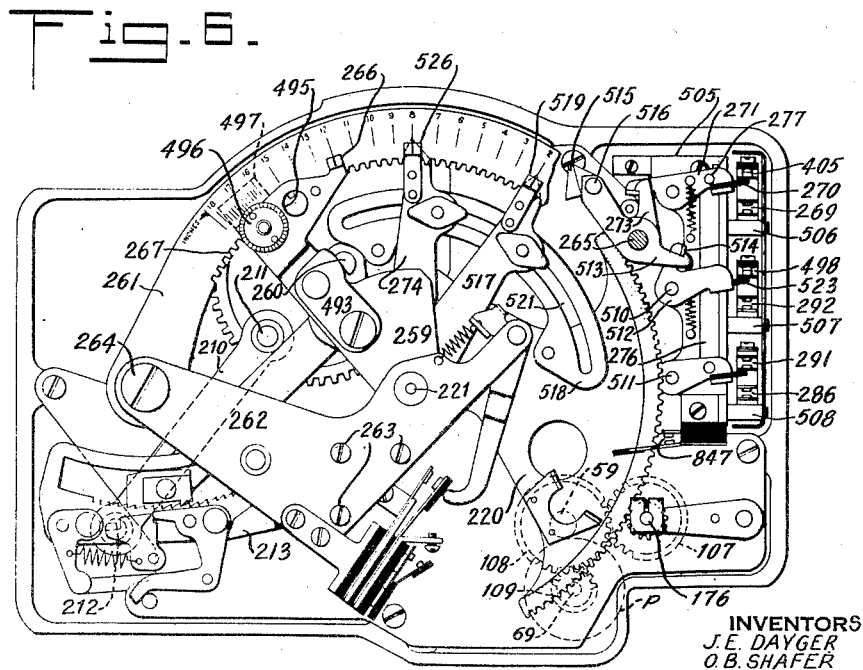
Fig. 6 is an elevation view of the carriage mechanism settable to predetermine the spacing of item lines on the bill forms.

Before describing the other connections for performing an ejecting operation, it is believed well to mention that such an operation may take place at any point during printing down the length of a record strip. Ejection is initiated by energization of magnet EM to feed the strip from form to form after line spacing operation has brought about an overflow condition, or when a group change and total printing operation calls for another blank form. In Fig. 6, the ejecting devices are shown in the normal position. There it is noted that a link 210 is articulated at 211 on the side of plate 200 and at the other end it is pivotally connected at 212 to the side of an ejecting frame 213 (Fig. 7) pivoted at 209 on the frame of the control unit. This rocking eject frame 213 is formed in the shape of an arc and carries a similarly shaped plate 247 with a series of teeth 214 cut in the inner side of the arc. Cooperating with these teeth is a block 215 formed with a single tooth 216 adapted to ratchet over the teeth 214 and engage any one of the teeth as a link 217 carrying the block 215 is drawn along the inner surface of the arc during line spacing operation. The block 215 is loosely pivoted on link 217 by means of a stud 218 mounted on link 217. An arcuate guide strip 219, secured to plate 247, cooperates with a groove in the top of block 215 and serves to hold the block in alignment with teeth 214. When the clutch connection comprising pawl 198 and clutch plate 197 is made effective by the energization of the magnet EM, the plate 200 is connected to turn in a clockwise direction and thus moves link 210 (Fig. 6) and frame 213 on to the right with a gradually accelerated motion until the plate 200 has moved through an angle of ninety degrees and then the motion is retarded until the link is practically at rest as the plate reaches a midway position after the initial 180 degrees of motion.

Then the same type of motion is repeated as the plates goes through the final 180 degrees in arriving back to the home position after a complete revolution.

Continuing now with outlining the connections of link 210 to the line spacing devices for the purpose of ejection, it is noted that in the motion to the right the link carries along the ejecting frame 213 by rocking it in a clockwise direction about the pivot 209 (Fig. 7). As this is done, the teeth 214 on the eject plate 247 engage the block 215 on the end of link 217 and move this link to the right. The right end of link 217 is connected by a stud 246 to a sector 220 loosely pivoted on a shaft 221. The sector teeth are in mesh with a pinion 222 which is clutched to the line spacing shaft 176, which, as noted hereinbefore, serves to space the feed drive shaft 69 through the connections to gear 107 (Fig. 6).

As sector 220 is rocked step-by-step clockwise to the right in line spacing, the tooth 216 (Fig. 7) ratchets idly over tooth after tooth along the line of teeth 214, while member 213 and plate 247 are in a horizontal position. The sector is stepped along in unison with the spacing of the strip because shaft 176 and pinion 222 are operated for each spacing cycle. Then, at any selected point in the operation, and when tooth 216 is in mesh with any of the teeth 214, ejection is performed by rocking member 213, pushing link 217 connected thereto through tooth 216 and block 215, rocking sector 220, and turning gears 222, 107 (Fig. 6), 108, 109 and shaft 69 which is geared to the pin wheel drive for the bill form as explained hereinafter.

The return stroke of sector 220 may be adjustably varied to determine the length of form to be printed in the machine.

The form may be shortened by stopping the sector 220 at any point along its travel counter-clockwise towards the left (Fig. 6). For this purpose, a lever 259, pivoted on shaft 221, carries a stopping block 493 cooperating with a stud 260 mounted on the side of sector 220. The upper end of the form length setting lever 259 is adapted to be adjusted around and held in any position along an arc formed by a segmental index plate 261. This index plate is secured at 264 to a frame plate 262 which is held to casting 134 by screws 263, and at the other end the index plate encircles shaft 265. The surface of the index plate is inscribed with long lines representing inches of spacing, and short lines (not shown) representing lines of print spacing. A pointer 266 is formed on the end of lever 259 opposite a gripping plate 497 to indicate the length of sheet selected. The bottom edge of plate 261 is formed with rack teeth 267 which are engaged by a key in the shape of a pinion that is inserted in aperture 495 and turned to move lever 259 and sector 220 to a selected position against the pressure of a spring 242 (Fig. 7).

When the selected position is reached, the lever may be locked in place by turning a nut 496 (Fig. 6) on a screw passing through the gripping plate. Corrugations on plate 261 and lever 259 lock the lever in place when plate 497 is drawn towards lever 259 to pinch index plate 261 therebetween.

A series of contacts are employed to control the ejection and line space magnets and the tabulating start and stop devices. These contacts are supported on the inside of the casing 134. In Figs. 6 and 7 it is seen that a channel bar 505 supports three blocks 506, 507 and 508 each holding a pair of contacts. The channel is secured to casting 134 and formed to hold stud 509 and shafts 510 and 511 supporting the operating members for the contacts.

The machine is provided with devices for skipping a variable amount of space between the last item line and a predetermined total line. It is described hereinafter how the line spacing magnet LSM is energized to start the skipping operation. After feeding a selected length of strip, space skipping is stopped by opening contacts 498 (Fig. 6) with devices about to be described.

The skip stop contact 498 is held closed by a bell crank 512 fastened to shaft 510. The crank in turn is held by a latch 513 pivoted on shaft 265 and formed with a shoulder engaging a lug 514 on the crank. At the end of the latch is pivoted a flipper 515 on a stud 516. The latch is operated by an adjustable tripping lever 517 fastened to an arcuate slotted plate 518 (Fig. 6) secured to the sector 220. The upper end of the lever 517 is formed with a pointed cam face d which cooperates with flipper 515 to rock the latch and release the bell crank 512. Because the mounting of flipper 515 is flexible, the latch 513 is tripped and crank 512 moves back ready to relatch even though lever 517 remains directly beneath flipper 515. A pointer 519 on the lever 517 may be set to the proper point along scale 261 so that the first item line may be printed at any selected line of the forms on the strip. A screw and nut connection extending through lever 517 and a slot 521 in plate 518 may be moved along the slot and fastened in the desired position.

When bell crank 512 is released, a spring urges it in a clockwise direction to lower an insulation finger 523 away from contacts 498 and down against contacts 292. Thus contacts 498 are opened and contacts 292 are closed for purposes described more fully hereinafter. The shaft 510 is attached to bell crank 512 so that it also turns to place an arm 524 (Fig. 5) thereon in the path of a roller 525 on the line space operating arm 168. The roller serves to restore the bell crank to the latched position shown in Fig. 6. During space skipping, roller 525 is lowered upon each spacing operation. When unlatched, arm 524 swings clockwise momentarily to rock crank 512 and open contacts 498, but the arm is rocked back counterclockwise by the roller 525 rising to the normal position at the end of the last space skipping operation.

For skipping to a predetermined total line, skipping is initiated by a group change and continues until stopped by the action of a settable arm 274 (Fig. 6) the cam point of which opens contacts 405 to stop skipping. Contacts 269 are closed to cause ejection of the form, but this awaits completion of a total printing cycle.

As explained hereinbefore, the ejecting operation is controlled by the energization of magnet EM. This magnet is energized at various times according to the setting of the controls and the closing of contacts to form a completed circuit. For one form of control, the contacts 269 (Fig. 6) are closed as the printing on the record approaches the end of a form. These contacts 269 are operated by an insulation finger 270 fastened to one end of a lever 271 pivoted on stud 509. The other end of the lever is formed with a lug 272 engaged by a latch 273 pivoted on shaft 265 alongside latch 513. Latch 273 is operated at a selected point in the feeding of a record form, by the cam face on the upper end of the lever 274 loosely pivoted on shaft 221 and held in place by a nut and screw projecting through a slot 521. A pointer 526 on the lever indicates the inches of space through which the record form is line-spaced before contact operation takes place.

When lever 271 is in the normal position, insulation finger 270 holds contacts 405 closed for reasons set forth hereinbefore. However, when lever 274 strikes latch 273, lever 271 is unlatched and free to rock in a clockwise direction as urged by a spring. Thus finger 270 is lowered to open contacts 405 and close contacts 269 which are in series with the eject magnet EM and adapted to initiate an eject cycle of operation.

The lever 271 is restored by a link 276 connected thereto by a pin and slot formation 277. Individual coil springs restore latches 273 and 513.

When an eject operation takes place, various electrical and mechanical devices in the machine must be operated to control carriage feeding, the operation of the carriage motor, the disablement of the line space latch, and the operation of the tabulating machine. Contacts are operated to cause a delay in the restarting of the tabulating driving connections during an eject operation. Other disengagements must be effected to free the line spacing shaft from ratchet connections during ejection. These and other controls are effected by the cam faces formed on the periphery of plate 200 (Fig. 7) which, as noted in a foregoing section of the description, turns through a complete clockwise revolution during an ejecting operation.

Cooperating with the cam plate 200 is a contact operating lever 279 pivoted at 280 on a fixed plate 139 and drawn by a spring 281 into contact with the periphery of the cam plate. The upper end of the lever 279 is formed with a projection 282 which acts as a cam face and also as a latch in cooperating with a notch 283 cut in the periphery of plate 200. Early in each eject cycle, the side of notch 283 acts as a cam face to rock lever 279 in a clockwise direction, moving down an arm 284 connected thereto by pin and slot connection 285. The arm is fastened to one end of shaft 511, the other end of which carries a member 287 with an insulation finger 288 for opening and closing contacts 286 and 291.

The initial movement of cam lever 279 serves to open contacts 286, but contacts 291 are closed later in the operation when a projection 289 on cam plate 200 strikes the end 282 of the lever, rocking it further in a clockwise direction and lifting finger 288 against contacts 291. This final lifting movement serves also to restore lever 271 (Fig. 6) which is rocked counterclockwise by link 276 (Fig. 7) attached to member 287 by stud 290.

The carriage control contacts 405, 269, 498, 292, 291 and 286 (Fig. 6) are sometimes merely referred to as carriage contacts #1—#6, respectively in order of appearance down the side of the unit.

Before pointing out the drive connections between the automatic carriage unit CU (Fig. 8) and the front pin feed shaft F, it is believed advisable to point out the paths of the two strips B and R with reference to Fig. 10.

Assembled above the main carriage frame 11 are curved guides 12, 13 and 14, and paper tables 15, 16 and 17. They are supplemented by guide rods 18 and 19, and a pair of large guide discs or rollers 20 loosely mounted on a rod 21 suspended by arms 22 on the back pin wheel shaft BK.

The bill strip B is drawn from a supply source at the rear and passes over guide 12, under guide 15, around the front of platen P and directly under the usual inking ribbon RB. Then it extends upward and over the pins of the pair of pin wheels 24 and finally passes back on the top of guide 14.

Register strip R is also drawn from the back and passes over guide 13, under rod 19, over rod 18, down over table 16, around the platen P and under strip B which either has carbon backing or carbon strip thereon. After passing the print receiving line, strip R is drawn back over rod 18 and there is where it is tensioned in both directions by the discs 20 resting thereon. Continuing the course of strip R it is seen to be drawn around the back of discs 20 and up around pin wheels 25 before passing back over table 17.

Pin wheel units 24 are seen to be on separate frames 27 which are slidably mounted on the front keyed shaft F and a guide rod 28 to which they may be clamped by hand screws 29 when properly positioned. Pin wheels 25 are similarly mounted with respect to shaft BK and a guide rod 30. These pin wheels 24 and 25 are of the twisting pin variety shown in detail in Paris Patent No. 2,315,731.

The platen P is of the liftable variety and is swung on a heavy bar 60 (Fig. 8) with pivots 59 (Fig. 9) in extensions 58 on side plate 57. On the outside, the platen frame has a handle 62 for swinging it upward before assembling record strips thereon. The construction is similar to that shown in Patent No. 2,189,025. There it is also shown that a clutch is interposed between the carriage unit and the platen drive shaft. In the present instance, the clutch 110 (Fig. 8) is also provided so that for hand feeding by knob 33 the platen P may be disconnected from the carriage drive gear 109. However, it should be noted that the other part of clutch 110 is on star wheel 111 which is pinned or keyed to platen shaft 69 in order to communicate with drive gearing on the outside leading to the front pin wheel shaft F.

The front pin wheel unit (Fig. 9) is in frames 31 removably held on lower side plates 32. Most of the outer drive gearing for the front pin wheels is mounted just inside the outer frame 31 and plate 32 as seen in Fig. 8b.

Figure 8A:
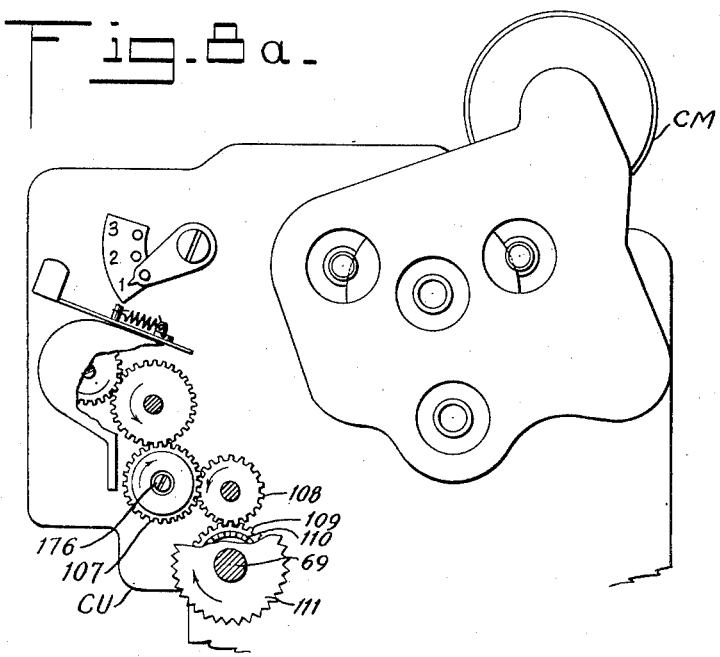
Fig. 8a is a section taken along line 8a—8a in Fig. 8 and it shows some of the drive gears leading to the front pin wheel units for advancing the bill strip differentially as driven by the automatic carriage.
Figure 8B:
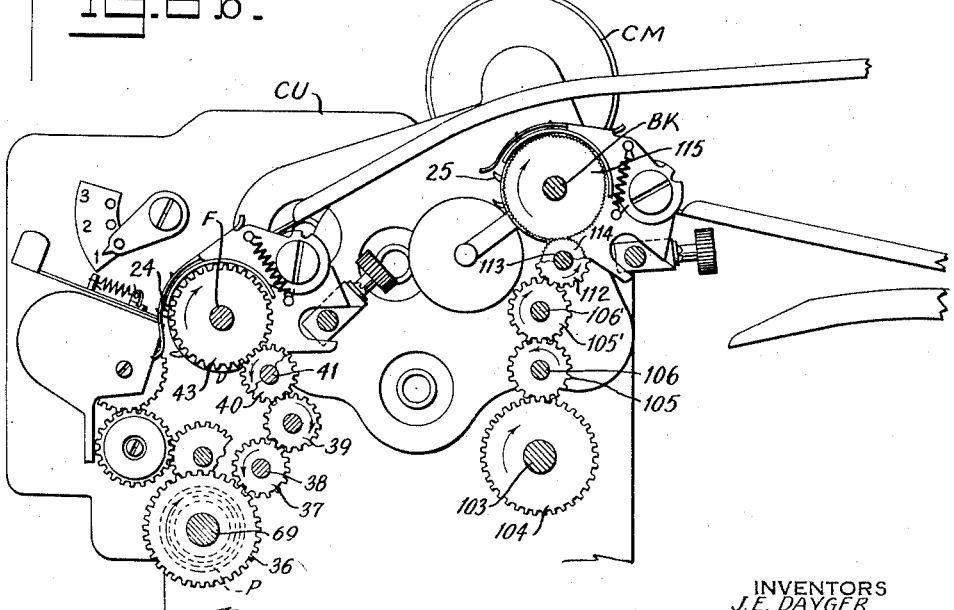
Fig. 8b is a section taken on line 8b—8b in Fig. 8 and showing the drive gears for operating the front and back pin wheel units. The gears at the left are part of the drive to the bill strip and the others step the register strip.

In order to trace the drive to the front pin wheels from its source, reference is made to Fig. 8a where it is seen that the carriage pinion 107 on shaft 176 is in mesh with the idler gear 108. Gear 108 in turn meshes with gear 109 (Fig. 8) mounted on a short sleeve 35 shiftable and loosely held on the platen shaft. Gear 109 has a clutch hub which together with a clutch hub on star wheel 111, forms a clutch 110 normally connecting the automatic carriage drive to the platen shaft 69 which is fastened to the star wheel 111. However, the outer rubber roller or platen P is loosely mounted on shaft 69 and is not driven. It provides a print striking surface and only turns due to the frictional engagement of the record strips.

On the right end of platen shaft 69 (Figs. 8 and 8b) is fixed a gear 36 which drives a gear 37 (Fig. 8b) pivoted on a stud 38 inside the side plate 32. Also pivoted inside the side plate are gears 39 and 40, the former being driven by gear 37 and in turn driving gear 40 which has a hub connecting it to a gear 42. Gears 40 and 42 are pivoted on a stud 41 extending from the inside of plate 32. Gear 42 drives a gear 43 which is fastened to the front pin wheel shaft F. Therefore, the drive from the carriage at the left end of the platen shaft is transmitted therethrough and directed through the train of gears 36, 37, 39, 40, 42 and 43 to the pin wheels 24 to advance the bill strip B.

A horizontally swinging lever 124 (Figs. 8 and 9) is provided to rock a vertical lever 119 (Fig. 8) which has a lower end (not shown, but as in Patent No. 2,189,025) protruding in an annular groove in the sleeve 35 of gear 109 for shifting the clutch 110 to a disconnected position.

The solenoid drive mechanism for the back pin feed wheels 25 and register strip R is assembled as a separate unit. The outside portion of the supports for the back pin wheel unit comprises a pair of plates 71 and 72 (Figs. 9, 11 and 12) held together with three hex bars 73, 74 and 75 also fixed to the main frame of the carriage. On the slanted top of plate 72 (Fig. 9) (and a similar inside plate not shown) the frames 76 of the back pin wheel unit are removably fastened.

Figure 11:
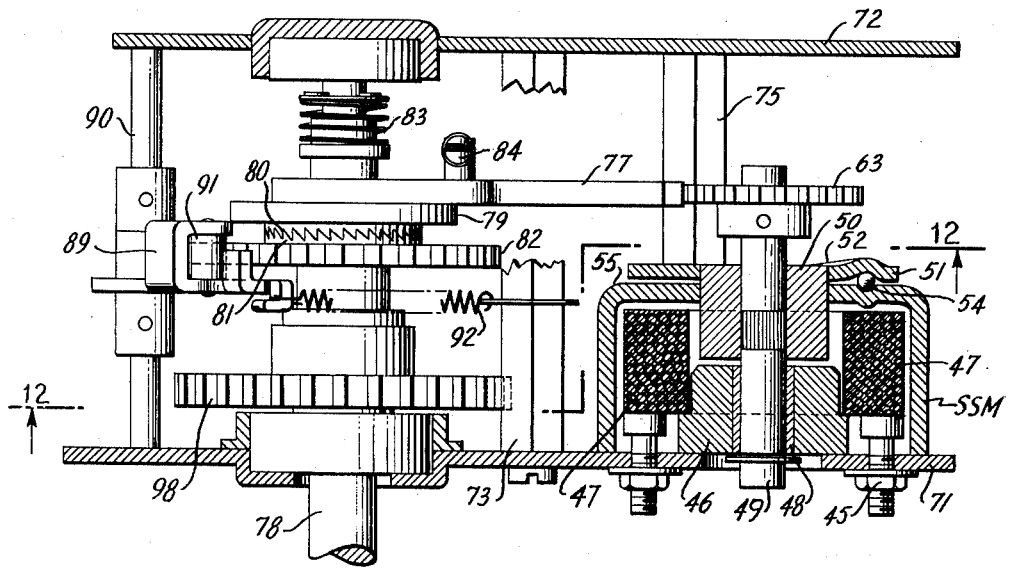
Fig. 11 is a sectional plan view taken along the line 11—11 in Fig. 9 and showing the solenoid spacing devices and the connections therefrom to the gearing for driving the register feed pin wheel.
Figure 12:
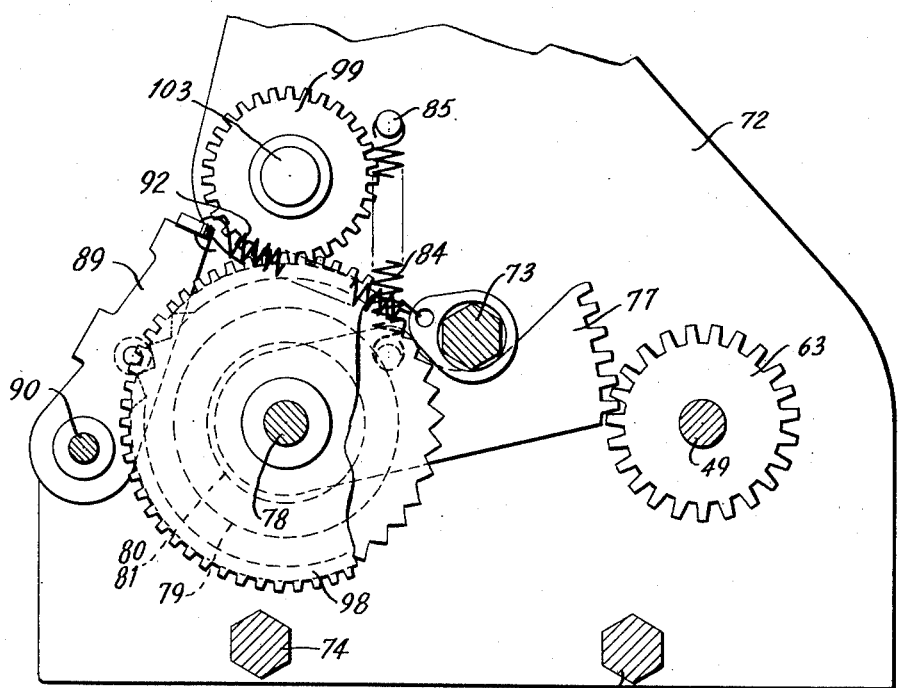
Fig. 12 is a sectional elevation view taken along the line 12—12 in Fig. 11 and showing the gearing from the solenoid drive to the register sheet gearing.

Referring to Figs. 11 and 12, the line spacing mechanism comprises a solenoid SSM (Fig. 11) attached to plate 71 by means of bolts 45, said plate 71 being mounted on the right hand end of the carriage by means of bars 74 and 75 (Fig. 12). The solenoid consists of a round core 46 (Fig. 11) surrounded by a coil 47. A bushing 48 mounted in the center of said core 46 is adapted to slidably support a shaft 49 having an armature 50 fixed thereto. Also fixed on said shaft 49 is a disc 51 having three arcuate grooves 52 formed in its inner surface, said grooves 52 each having a slanting depth. Three balls 53 are mounted between said grooves 52 and spherical grooves 54 are formed in the casing 55 of the solenoid. said grooves 54 being similar in depth.

The reason for the disc 51 and the balls 53 is to impart a rotary motion to the shaft 49 from the linear motion of the armature 50. When the coils 47 are energized by an impulse, the armature 50 will be pulled in towards the core 46 and as said armature 50 moves inward, the balls 53 will ride in the arcuate grooves 52 of the disc 51 and, due to the slanting depth of said grooves 52, the balls 53 will cause the disc 51, shaft 49, and armature 50 to rotate in a counterclockwise direction (Fig. 12).

Fixed to the end of the shaft 49 is a gear 63 which meshes with a sector element 77 loosely mounted on a shaft 78 journaled in the side frame 72 of the carriage. Fixed to the side of said sector 77 is a hub 79 and a clutch element 80 (Fig. 7), the clutch element 80 being an integral part of said hub 79. The teeth of said clutch element 80 are adapted to mesh with the teeth on a second clutch element 81 which is an integral part of a star wheel 82 fixed to said shaft 78. A spring 83 on shaft 78 tends to keep the clutch elements 80 and 81 in mesh.

Thus, when the solenoid is energized, the gear 63 is rotated in a counterclockwise direction driving said sector element 77 and clutch element 80 in a clockwise direction. The clutch element 80 in turn drives the clutch element 81, wheel 82, and shaft 78 in a clockwise direction.

It will be assumed that the solenoid and sector element 77 are proportioned to impart a degree of rotation to the shaft 78 equivalent to one line space on the register form.

When the solenoid is de-energized, a spring 84 between a stud 85 and the sector element 77, forces said sector element 77 to restore in a counterclockwise direction. As a result, the disc 51 and armature 50 will also be restored to normal position as the hub 79 and clutch element 80 are restored in a counterclockwise direction. As the hub 79 and clutch element 80 restore in a counterclockwise direction, they will be cammed against the tension of the spring 83 by virtue of the coaction between the teeth on clutch elements 80 and 81. When each tooth on clutch element 80 clears the corresponding tooth on clutch element 81 (clutch element 80 moving in a counterclockwise direction while clutch element 81 is stationary), spring 83 will force said clutch element into mesh with clutch element 81.

A detent member 89, fixed on a rod 90 which is rotatably mounted in the plate 71 and side frame 72, has a roller 91 which rides on the teeth of the star wheel 82 for the purpose of holding said wheel and shaft 78 in position when the mechanism is restoring. The detent member 89 and roller 91 are urged against wheel 82 by a spring 92 drawn between said member 89 and the bar 73 fixed between plate 71 and side frame 72. Bar 73 also serves to limit the upward or restoring movement of the sector element 77 thereby establishing a home position.

Mounted near the outer end of shaft 78 is a gear 98 which meshes with a gear 99 fixed on a shaft 103 journaled in the plate 71 and side frame 72. On the other end of said shaft 103 and just inside the carriage side frame 72 is fixed a gear 104 (Fig. 8b). Said gear 104 drives a gear 105 pivotally mounted on a stud 106 extending inside the side frame 72. The gear 105 in turn drives a gear 112 pivotally mounted on a short stud 113 extending from said side frame 72. Fastened to said gear 112 through a short hub is a gear 114 which drives a gear 115 fixed on the shaft BK. The shaft BK (Figs. 8 and 8b) is journaled in the side frames 76 on the carriage and supports the register strip pin wheels 25 (Figs. 8, 9 and 8b).

Thus, when the solenoid mechanism is operative the drive is taken from gear 104 (Fig. 8b) and shaft 103 and is transmitted to said pin wheels 25 by means of the said gears 105, 112, 114 and 115 to advance the rear form or register sheet one line space.

As shown in the wiring diagram (Figs. 13a-13g), the controls of the automatic record feeding devices are coordinated with the controls of an alphabet printing tabulator. The tabulator is of the type disclosed in United States Patents Nos. 2,079,418 and 2,172,067 and 2,199,547, and application Serial No. 609,854, filed on August 9, 1945, to which reference may be made for details of construction. Before describing the manner in which an automatic carriage and dual spacing solenoid are influenced by the ordinary tabulator controls and operations, and vice versa, it is believed well to outline some of the usual tabulator operations.

In such machines a motor TM (Fig. 13a) is connected to communicate a drive through two clutches which are selectively operated for card feeding and printing operations. A number of CF cam contacts operate only when the card feed clutch is engaged. Certain PM contacts operate only when the printer clutch is engaged. Other CB contacts operate all the time that the motor is active. A series of TS contacts are operated only when a total taking cycle is initiated.

After record cards, such as those shown in Fig. 1, are placed in the feed magazine, an initial feeding cycle is brought about by pressing a start key to connect the card feed clutch devices. The cards are then advanced in succession with each one passing first under a set of upper brushes UB (Fig. 13c) and then one cycle later under another set of brushes, identified as lower brushes LB, before passing into a stacker.

As the card feeding starts, a cam contact CF9 (Fig. 13c) closes to call in a relay R1. The circuit passes through line 100, circuit breaker contacts CB2—4, timer contacts CF17, CF18, contacts R2a, a common brush, the upper brush contact roller, brush 301, wire 302, cam contacts CF9, the pickup coil of relay R1, wire 303 and line 101. Relay R1 is then held through contacts R1a and CF8 until the first full cycle is well advanced.

Relay R1 is effective to open contacts and deenergize the connections to the card feed clutch. Thus the card feed mechanism is operated for one cycle and then stopped.

Under initial starting conditions it is necessary to depress the start key a second time to cause a continuous succession of card feed cycles. As soon as cards continue to feed and insulate the brush 301, relay R1 remains deenergized and certain of its contacts remain closed to maintain the holding circuit for the card feed clutch controls. Another relay R2 is connected with relay R1 to control contacts at various points in the machine in the nature of an upper card lever control.

The lower card lever relays R3 and R4 (Fig. 13g) are energized when the first card passes below the upper brushes UB and they remain energized until the last card passes the lower brushes LB. The first card closes the lower card lever contacts LCLC after digit analysis under the upper brushes. Then cam contacts CF6 also close to energize the relays by the circuit: line 100, wire 305, cam contacts CF6, card lever contacts LCLC, relays R3 and R4, and line 101. A holding circuit is set up through cam contacts CF7 and relay contacts R3a.

In listing operations the record card passes the lower brushes LB in synchronism with the upward movement of the type bars. Magnets PR (Fig. 13c) operate stop pawls to locate the type bars in positions corresponding to the data punched in the card and, at a predetermined time, hammers are tripped to record the information on the record strip. Adjustment of the type bars is regulated by impulses carried to magnets PR from the lower brushes LB. An illustrative printing control circuit involves line 100 (Fig. 13c), contact breakers CB2—4, wire 307, timer contacts CF17 and CF18, lower card lever relay contacts R4a, the common brush, contact roller, through the perforation in the card by a lower brush LB, the brush socket, plug wire to socket 308, normally closed total contacts TSa, magnet PR and line 101.

Contacts TSa are shifted for total cycles so that printing is then controlled by impulses from an accumulator rather than from the lower brushes.

Many operations of the tabulator and record feeding devices are directed under the control of what are called X distributors. These distributors are switches that are operated under control of special digit or X perforations punched in cards for distributive control purposes. Contacts CF5 (Fig. 13d) are closed at the instant the X holes pass the card reading brushes. They set up a circuit for multi-contact relays as follows: line 100, cam contacts CF5, wire 351, contacts R1b closed as long as cards are feeding, multi-contact relay XR and line 101.

At the bottom of Fig. 13d it is seen that relay XR controls a contact XRa in series with an X distributor pickup coil R36 which receives X impulses through a socket X connected to an upper brush UB. A similar pickup coil PL for relay R36 is provided with a socket D to receive digit impulses when a digit selector is used in connection with special holes sensed at the upper brushes.

A sample circuit for sensing a special X perforation is as follows: line 100 (Fig. 13c), contacts CB2—4, wire 307, timing contacts CF17, CF18, upper card lever control contacts R2a, the common brush, contact roller and through the record card as sensed by an upper brush UB to detect an X perforation, a socket in line with the related upper brush, a plug wire to socket X (Fig. 13d), contacts XRa, the pickup coil of relay R36, wire 310 and line 101.

The action of a pickup coil is usually preparatory to the X distributor control which takes place a cycle later in the operation than the cycle in which the special perforation is sensed while the card is under the upper brushes. Therefore, there are times when another relay is picked up to become effective during the cycle when the card is passing the lower brushes, at which time it is desired to distribute the data sensed therefrom or alter the nature of the accounting operation.

For the purpose of calling a second X distributor relay into operation the first one closes contacts in series with the second. Also in series with this pickup coil are digit transfer contacts such as DT20 (Fig. 13f) which are cam-operated to hold the pickup circuit at the time that the contacts CB29 open (Figs. 13b and 13f), which is overlapped by the time that cam contacts CF15 close.

Group control devices are provided for separately considering different classes or groups of cards as distinguished by different group number perforations for different groups. Consecutive cards are compared; one card being read at the upper brushes while the preceding card is read at the lower brushes. As long as the card readings are alike, the card feed continues to function. When the machine senses that the two group readings are not alike, the card feed stops, the bill is advanced to the predetermined total line, the machine prints the total, the accumulator is cleared to zero, the bill is ejected and register strip advanced, and the machine automatically starts feeding the cards of the next group.

Preliminary to the establishment of group control circuits, a number of preparatory relays R169—R172 (Fig. 13g) are energized to close the circuits for the comparison relays. The preparatory circuit includes line 100, cam contacts CF19, relays R169—R172, wires 311, 312 and 313, and line 101. As an example of the effect of these relays, it is seen that relay R169 serves to close contacts R169b in series with the group control pickup coil R129.

The actual comparing circuits are connected by plug wiring between the pickup coils and certain upper and lower brushes devoted to sensing group numbers or special perforations. An example of the comparing circuits is as follows: line 100 (Fig. 13c), contacts CB2—CB4, wire 307, timer contacts CF17 and CF18, contacts R2a, the common brush and contact roller, through the perforation in the card sensed by upper brush UB, a plug wire connected from a socket in line with the upper brush to a socket 314 in line with the pickup coil of relay R129, contacts R169b and wires 312 and 313 to line 101. As long as group numbers agree, a companion circuit to that already traced is set up at the same time through a pickup coil of a relay R130 as energized through the lower brushes by a similar circuit. Relays R129 and R130 have holding coils and contacts in series therewith for sustaining the comparing circuit connections.

Figure 13A:
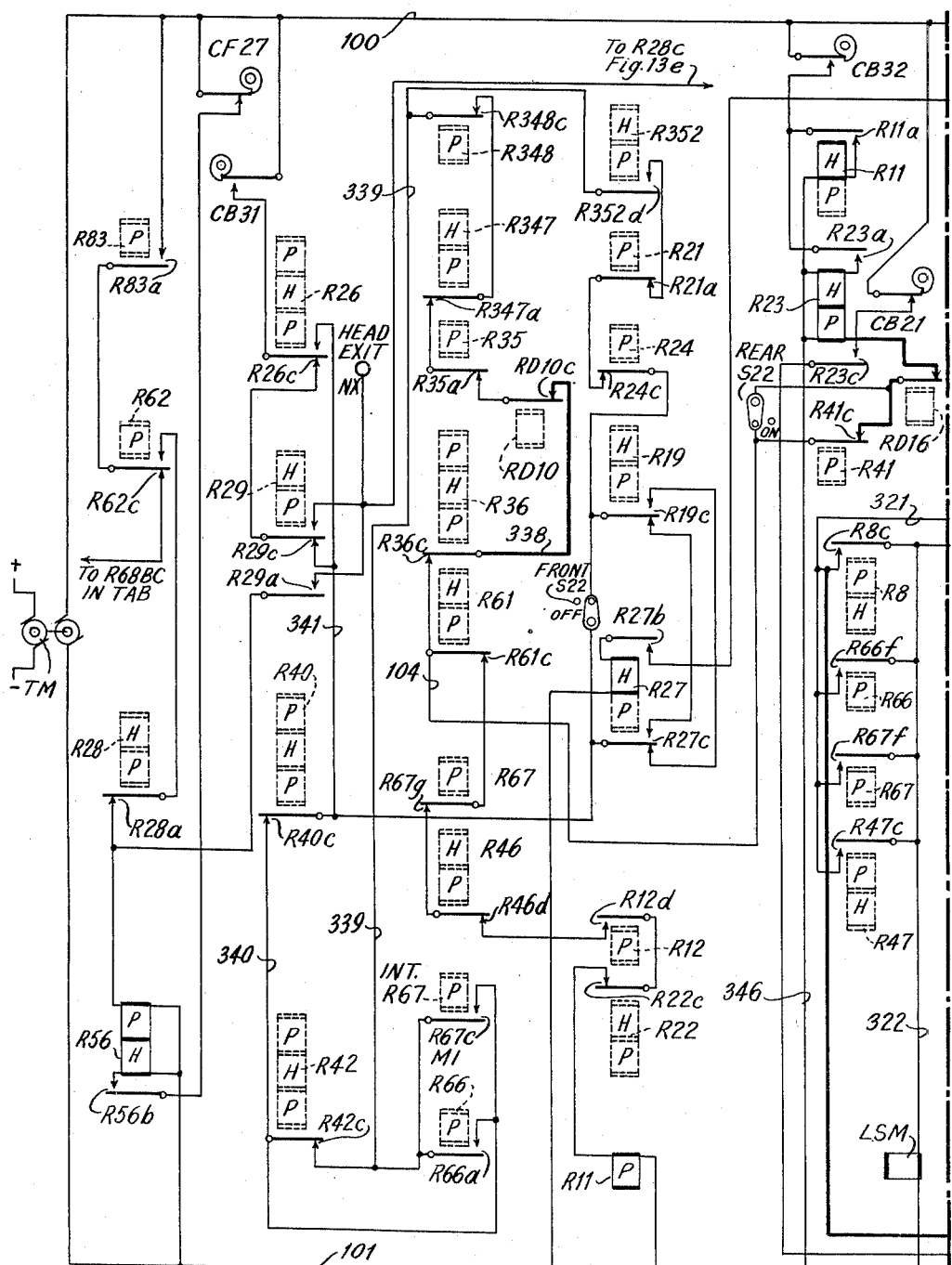
Figure 13C:
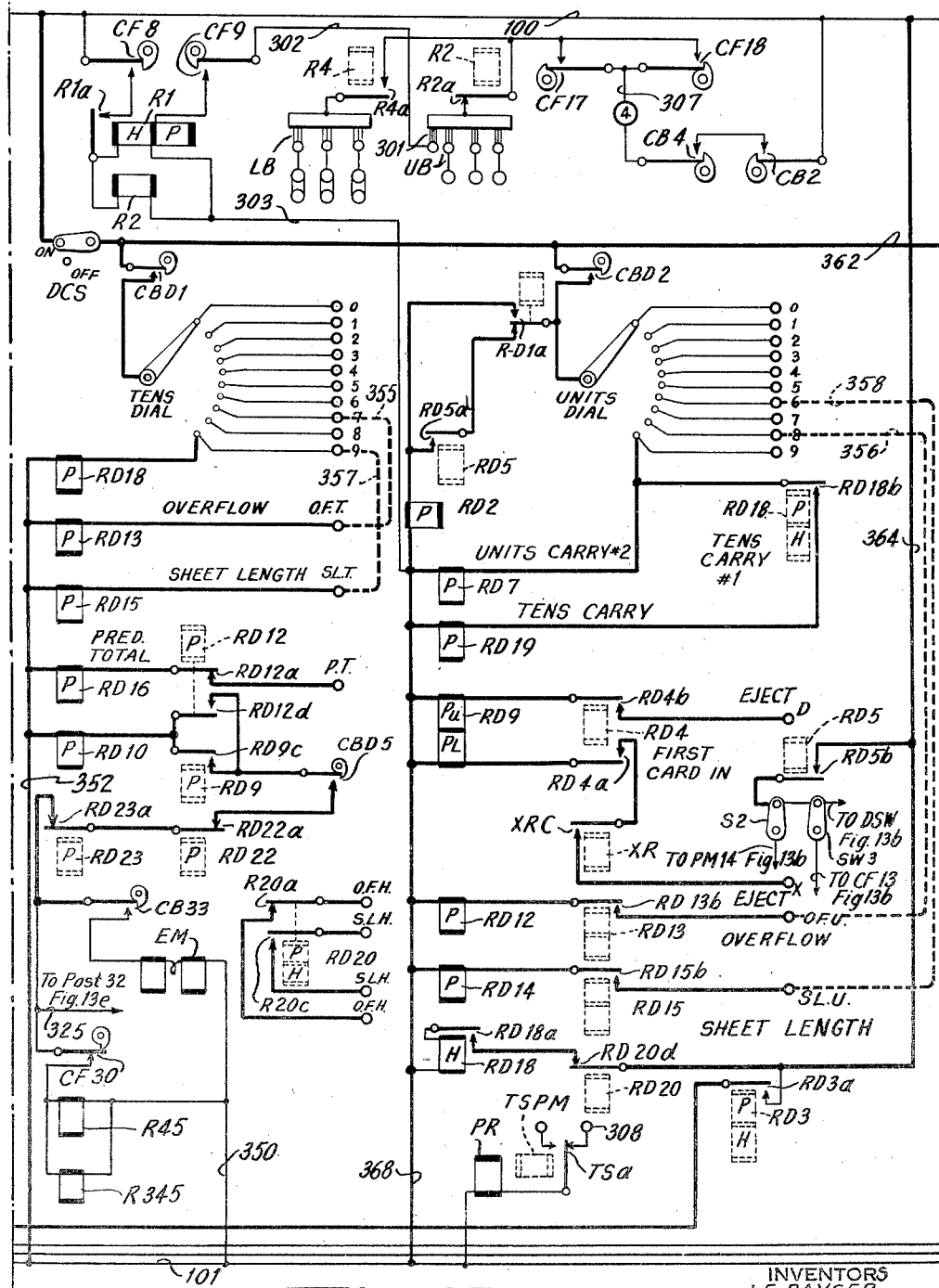
Figure 13E:
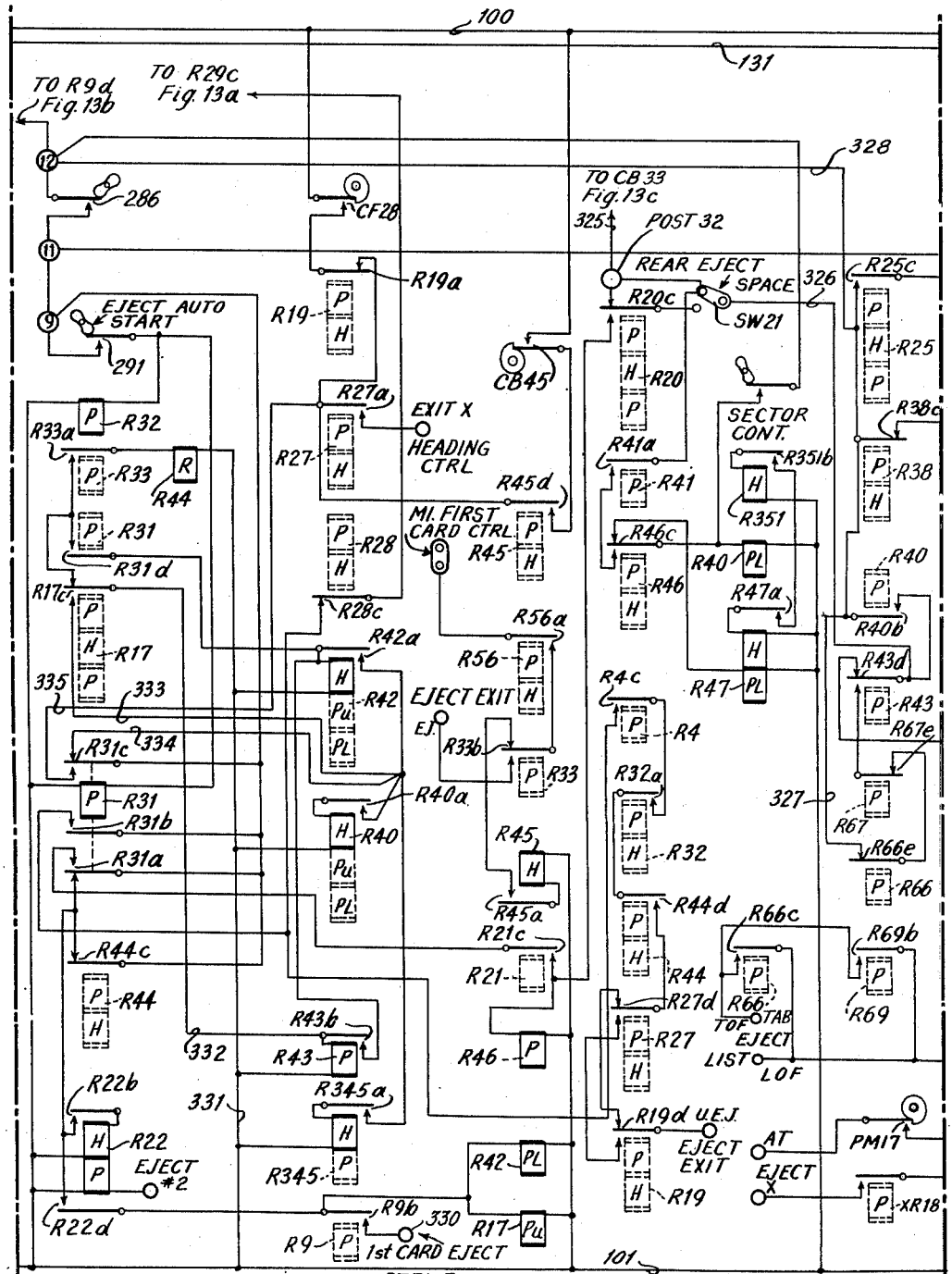
Figure 13F:
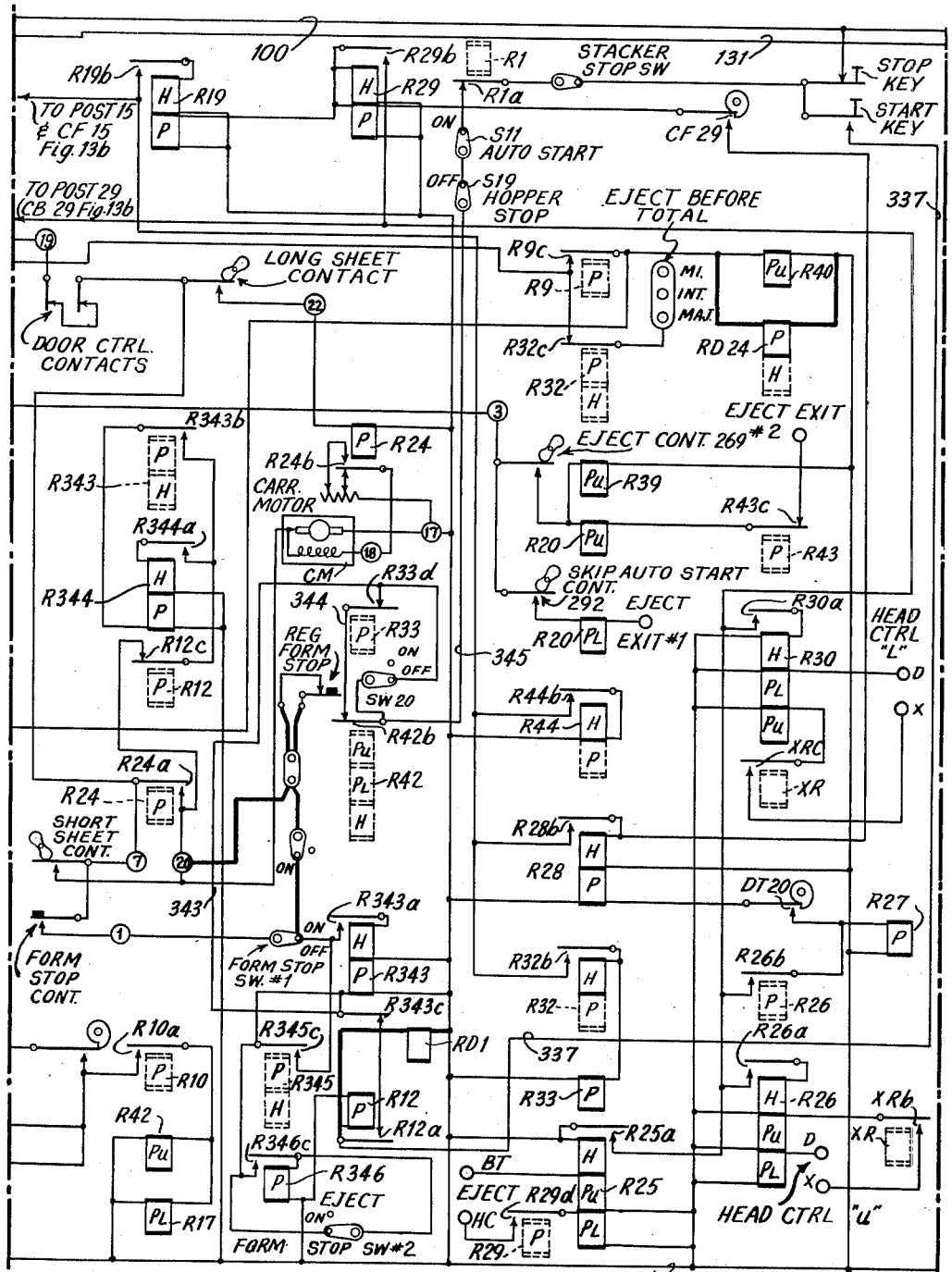
Figure 13G:
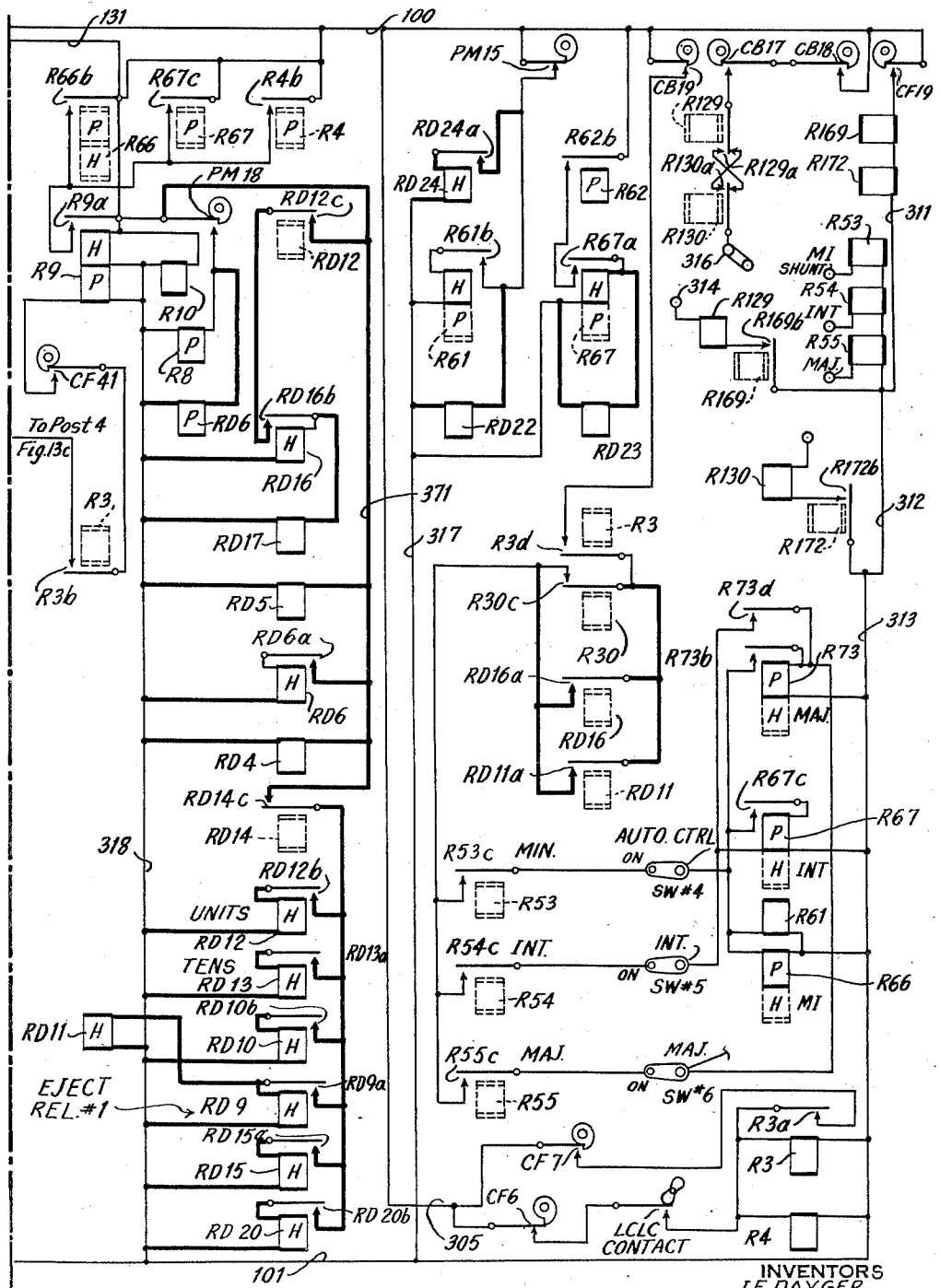

Referring to the upper right-hand corner of Fig. 13g, it is seen that the pairs of comparing relays are associated with pairs of contacts so arranged that, when a related pair, such as relays R129 and R130, are energized at the same time, they fail to provide a circuit path. However, should one or the other be energized alone, showing that there is a disagreement in the group control perforations, then a circuit is established for initiating group control operation. Assuming that there is a disagreement in the group numbers in the upper orders and that relay R129 is energized before relay R130, then the following circuit is established for setting up a minor control operation: line 100, cam contacts CB17, CB18, the left contacts R129a, the right contacts R130a, a plug wire connection between the orders and socket 316, plug wire to socket MI SHUNT, the pickup coil of relay R53, wires 312 and 313 to line 101. A holding circuit is established for relay R53 due to the closure of a related contact in series with the holding coil. The holding coil of relay R53 operates other contacts R53c in series with minor control pickup coils of relays R61 and R66. The minor control circuit includes line 100, cam contacts CB19, lower card lever relay contacts R3d, heading control suppression contacts R30c, relay contacts R53c, switch SW4, the pickup coils of relays R61 and R66, wire 313 and line 321.

A holding circuit is established for relay R61 by the closure of contacts R61b and connections which may be traced from line 100, through cam contacts PM15, contacts R61b, relay R61, wire 317 and line 101. Associated with relay R61 is another minor control relay RD22 which is energized along with it. These relays have contacts throughout the machine for controlling the suspension of card feed, the initiation of total taking, etc.

The foregoing description of the group control comparison and the resulting pickup of relays for control purposes is duplicated with respect to other columns or groups of columns on the record cards for intermediate and major control. The particular columns selected for control are made effective by plugging from various sockets, such as 316 to the sockets INT and MAJ. Then the intermediate relay R54 and major control relay R55 are called into action to set up circuits for relays R67 and R73 similar to that of the minor control described in connection with energization of relay R61. Associated with intermediate relay R67 is another control relay RD23.

The "1st CARD IN" control involves not only relay R10 but also relays R3 and R9 as shown at the upper left in Fig. 13g. There it is seen that the pickup coil of relay R9 is energized by a circuit involving line 100 (Fig. 13c), contacts CB2—4, post #4, a wire to the lower card lever relay contacts R3b (Fig. 13g), cam contacts CF41, relay R9, wire 318 and line 101. Contacts R9a are then closed to provide the holding circuit from line 101, through relay contacts R4b or intermediate control contacts R67c, contacts R9a, relay R9, wire 318 and line 101.

The circuit arrangements mentioned hereinbefore deal mainly with the control of the tabulator, while those about to follow are concerned more with controls reaching into the automatic carriage to operate magnet LSM for line spacing and skipping, and magnet EM for long feeding or form to form ejection.

It will be realized that the circuits about to be traced for line spacing and ejection control are not all the circuits possible to exercise control thereover. These circuits given are pertinent to the present invention and all that are necessary for an understanding, which should not be burdened with extraneous matters. Wherever needed, cuprous oxide rectifiers may be inserted to prevent back circuits. The abbreviations n/o and n/c are used to signify, respectively, normally open and normally closed conditions of contacts named in connection therewith.

The line spacing control for ordinary listing operation provides a circuit through magnet LSM when printer cam contacts PM11 close after each printer operation. The circuit for list spacing includes line 100 (Fig. 13e), a wire to post #11, carriage contacts 286 opened only on ejection operation, post #12, a wire to relay contacts R9d (Fig. 13b) closed after the first card is past the upper brushes, relay contacts R22a opened only on ejection control, relay contacts R45c also opened only as an ejection interlock, dual feed switch DSW, a wire to switches S2 and SW3 (Fig. 13c), a wire from switch S2 to printer cam contacts PM14 (Fig. 13b), wire 320, dual switch DSW2, wire 321 (Fig. 13a), relay contacts R8c closed after the first card is in, wire 322, and magnet LSM connected to line 101.

When the line spacing control is used for space skipping, then another circuit is established for space magnet LSM depending on relays R34 and R35 and holding circuits therefor to shift contacts R35c for establishing the following circuit: line 100 (Fig. 13e), a wire to post #11, carriage contacts 286 closed until ejection, post #12, a wire to "first card in" relay contacts R9d (Fig. 13b), interlock relay contacts R22a, ejection control relay contacts R45c, skip control relay contacts R35c, sheet overflow relay contacts R46a, control relay contacts R344c opened only by strip end, printer cam contacts PM9, control relay contacts R348a of space control interlock, wire 322 (Fig. 13a), magnet LSM and line 101. Then magnet LSM continues to be energized and space skipping continues until the holding circuit for relays R34 and R35 is broken by the opening of skip stop contacts 498 (Fig. 13b).

The operation of the eject mechanism of Fig. 7 for long feeding upon the energization of magnet EM is explained hereinbefore. Now it is pertinent to note that upon an overflow condition or a group change the magnet is energized to feed the record B from form to form.

Assuming that ejection is to be caused by a group change, then a plug wire connection is made between an unequal group control impulse socket such as 316 (Fig. 13g) to socket 330 (Fig. 13e) for picking up relays R17 and R42 whenever card group numbers change. In Fig. 13e it is seen also that relay contacts R17c are in series with another relay R43 which is then made effective to call for ejection. The circuit for relay R43 includes line 101, wire 331, relay R43, wire 332, lower relay contacts R17c, wires 333 and 334, interlock relay contacts R31c, wire 335 to post #9, a wire to post #11, and a wire to line 100.

Relay R43 then closes contacts R43d in series with the eject magnet EM to call it into operation for a long feed advance. The eject circuit includes line 101 (Fig. 13c), magnet EM, cam contacts CB33, a wire 325 to post #32 (Fig. 13e), switch SW21, wire 326, relay contacts R43d n/o, intermediate control contacts R57e closed after printing, minor control contacts R66e, wire 327, wire 328, post #12, interlock contacts 286, post #11 and a wire to line 100. Ejection then takes place to advance the record strip from form to form.

The wiring connections shown in heavy lines are mainly for the purpose of coordinating the register strip spacing solenoid SSM and the two stepping switch controls with the tabulating and automatic carriage circuits already mentioned. They provide a means for not only moving the register sheet with the bill form, but also measuring such movement to control spacing of condensed data on register sheets of a preselected form.

It is already noted that each form is fed independently of the other by an associated form feed, one of which is controlled by the automatic carriage mechanism and the other is controlled by the dual feeding device which is a line spacing means powered by a solenoid. Each time that the solenoid is energized it causes the register strip form associated therewith to be advanced one line space. By circuit means to be described the dual feeding device solenoid may be energized for the following operations, namely, (1) single line spacing before and after printing during list cycles (2) single line spacing before and after printing during total cycles (3) spacing to a predetermined total line (4) spacing (ejection) after a predetermined total. As a matter of convenience the circuit operations of the subject machine are described as being used in combination with standard accounting machine wiring.

An application for which the subject machine is intended may be appreciated from the drawings in Figs. 1 and 2. This application concerns a billing operation in which a bill form B (Fig. 2) and a bill register R are simultaneously prepared from record cards (Fig. 1) passing through the accounting machine. In the general operation of the machine, the spacing of the bill form (Fig. 2) is controlled by the automatic carriage mechanism set up for multiple line listing with predetermined totals followed by an ejection. The spacing of the bill register R (Fig. 3) is accomplished in the following manner: For each listing cycle the dual device solenoid SSM is energized before printing time. For a total cycle the solenoid is again energized before printing time and may be energized again after printing time if a space is desirable between bill groups on the bill register. The number of groups that may be printed on a register sheet is under the control of the space programming means consisting of step up type relays for counting line spaces. When the required number of groups have been listed or the required number of line spaces counted by the counting relays an ejection will be initiated immediately after the printing of the total for the last group on the register sheet.

The relays controlling dual feed operations are identified as RD relays and the circuits associated therewith are distinguished by the heavy lines. Before it is possible to describe circuits pertaining to dual feed operations, certain preliminary circuits for "run-in" control will be described insofar as it is necessary to explain the conditioning of dual feed circuits. The record cards shown in Fig. 1 are placed in the printer-feed hopper and upon depression of the start key (Fig. 13f) the start control relay R12 will be energized. Upon closure of an R12d contact (Fig. 13a) and CB31 cam contacts, a circuit will be completed to energize the auto start relay R11 which in turn causes the card feed unit to be operative. The R12 pickup circuit follows a path (Fig. 13f) through line 100, stop key contacts n/c, start key contacts n/o, wire 337, the pickup coil of relay R12, and a wire to line 101.

In Fig. 13a, the closure of the R12d contacts permits the energization of the auto start relay R11 when cam contacts CB31 close. The circuit is traceable as follows: Line 101, relay R11P, R22c n/c, R12d n/o, R46d n/c, R67g n/c, R51c n/c, R36c n/c, wire 338, RD10c n/c, R35a n/c, R347a n/c, R343c n/c, wire 339, R42c n/c, wire 340, R40c n/c, wire 341, R29c n/c, R28c n/c, CB31 cam contacts, to line 100. It will be noted in the circuit just traced that an RD10c contact has been added in what is otherwise the normal pickup circuit to relay R11. The purpose of the RD10c contact is to open the R11 circuit and cause an interruption in card feeding operations whenever an ejection is initiated for the dual feeding device. The pickup circuit for RD10 will be described hereinafter.

On initial card entering operations, the card feed unit operates for one feed cycle in view of the fact that R1 upper card control circuits, as already explained, do not permit automatic feeding operations until the second card feed cycle is under way. An R1c contact (Fig. 13f) of relay R1 is shown to be included in the hold circuit for relay R12 and being open at this time prevents the establishment of a hold circuit for relay R12. In order to cause the card feed to operate again after the first card feed cycle, the start key is again depressed to cause relay R12 to pick up again in the manner described. The auto start relay R11P (Fig. 13a) is immediately energized upon closure of the R12d contacts and the cam contacts CB31. During the second card feed cycle, hold circuits for relays R12 and R11 will be established. Both relays will therefore remain energized until the last card has passed through the printer. Because of the fact that certain of the dual feed circuits are conditioned by the tabulator run-in circuits, the hold circuits for both relays R12 and R11 will therefore be traced.

The hold circuit for R12 follows a path, in Fig. 13f, through line 101, relay R12P, R12a n/o, R343c n/c, wire 343, R33d n/c, wire 344, R42b n/c, wire 345, hopper switch S19, auto start switch S11, R1a n/c, stacker stop switch, stop key contacts, to line 100. A dual space control relay RD1 is wired in parallel with relay R12.

The hold circuit for relay R11H is traceable in Fig. 13a as follows: Line 100, CB32, R11a n/o, relay R11H, wire 346, to line 101.

Throughout the machine there are circuits influenced by relays energized when cards encounter the lower card lever and said circuits should await the regular feeding of cards and not be effective under starting conditions. Circuits of this kind are shown, in Fig. 13g, to control the pickup of relays R8 and R9. Before these circuits are explained, it might be convenient to trace the circuits controlled by the lower card lever also shown in Fig. 13g. The circuit through the lower card lever relays R3 and R4 follows a path through line 101, through R3 and R4 wired in parallel, lower card lever LCLC, cam contact CF6, and wire 305 to line 100. A hold circuit for R3 and R4 is maintained through an R3a contact and a CF7 cam contact.

Returning now to the pickup of relays R8 and R9, the circuit of R9P will first be traced. Beginning with line 101, the circuit continues through line 318, relay R9P, CF41, R3b n/o, a wire to post #4. (Fig. 13c), circuit breakers CB2—4 and line 100. Upon closure of R9a contacts (Fig. 13g), a hold for R9H is immediately established as well as a circuit to relay R10, as follows: Line 101, wire 318, R9H and R10, R9a, R4b to line 100. Within the same cycle of operation a PM18 cam contact closes to energize relay R8P as follows: Line 101, wire 318, R8P, PM18, R9a, R4b, to line 100. A hold circuit for R9H in Fig. 13b may be traced as follows: Line 101, wire 348, R8H, R8c, R37c n/c, R35c n/c, wire 349, R45c n/c, R22a n/c, R9d n/c, a wire to post #12 in Fig. 13e, interlock contact 286, post #11, and a wire to line 100.

Again referring to the R9H relay in Fig. 13g, it is apparent that once the hold circuit for R9H is established, parallel circuits will also be established for a pair of dual feed relays RD4 and RD5. In like manner, a special feed control relay RD6 is energized along with relay R8P and upon closure of RD6a points, a hold circuit for RD6H will be established in parallel with the R9H circuit previously traced.

There are also other circuits influenced by the sensing of X-perforations and said circuits should await the regular feeding and sensing of cards and not be effective under starting conditions before a card is under the upper brushes. In order to provide such X-control means, the machine is provided with the X-reading multi-contact relay XR, shown in Fig. 13d, controlled by cam contact CF5. An XRc contact point is shown to be included in the circuit to control the dual feed "X" eject control relay RD9 (see Fig. 13c).

Still other circuits in the machine are under the influence of the minor, intermediate and major group control relays identified respectively as R66, R67 and R73 in Fig. 13g. When, during the course of operations, a group control change and a carriage ejection are effected, the group change takes precedence over the ejection. Such a circuit may be seen in Fig. 13c beginning with line 101, wire 350, sheet eject magnet EM, CB33, wire 325 to post #32 (Fig. 13e) and eject switch SW21, wire 326, R43d n/o, intermediate points R67e n/c, minor points R66e n/c, wires 327 and 328, post #12, interlock contacts 286 n/c, post #11, and a wire to line 100. Referring to Fig. 13e, there is also shown an "eject before total" relay point R40b which, when closed, shunts around the circuit comprising contacts R43d n/o, intermediate points R67e n/c, and minor points R66e n/c. Therefore, when the "eject before total" relay R40 is also energized, during the conditions just described, the ejection will be initiated immediately and be completed before the printing of the total.

In dual feed operations, the dual ejection circuit is further conditioned by the group change and automatic carriage ejection circuits just described. Such a circuit, as shown in Fig. 13c, follows a path through line 101, wire 352, dual device relay RD10P, RD9c n/o, CBD5, minor contact RD22a n/c, intermediate contact RD23a n/c, wire 325 to post #32 (Fig. 13e) and eventually to line 100 by the circuit previously described. The RD22a and RD23a contacts are controlled by associated RD22 and RD23 relays shown in Fig. 13g as being wired in parallel with the normal minor and intermediate group control hold relays R66H and R67H, respectively.

The counting devices earlier referred to are the same stepping type of relays employed in Daly et al. Patent No. 2,369,441. They are used to count line spaces during dual feeding operations. In Fig. 13c the step up relays are schematically represented as the "units" dial and the "tens" dial. Each relay is provided with a dial magnet such as units magnet UD (Fig. 13d) and a dial return magnet such as units dial restore magnet UDR. When the dial magnet is impulsed the dial is advanced one position or step. On the tenth pulse, the units dial return magnet is energized to restore the dial to zero and, by means to be described later, a carry circuit causes the tens dial to be advanced from zero to one or additional single steps. Ten plug hubs (0 to 9) are associated with each step up relay and each hub is effective only when it is selected by contact of the dial arm.

The plugging controls for dual feeding may be explained as follows: Assuming that each bill register sheet is to be 16 inches (96 lines) long and that a maximum of 84 line spaces is to be used for listing and total printing operations. A maximum space of two inches (12 lines) will therefore be provided when the total line happens to fall on the 84th line. However, when the number of cards in each group (Fig. 1) varies as is generally the case, the 84th line (overflow point) may be encountered before every card in a group is listed. In this case, the listing of the remaining cards of the group will not be interrupted and printing continues beyond the overflow point (84th line) until the last card of the group is listed and followed by a total after which the register sheet is ejected as advanced by solenoid operation and a new sheet presented for printing.

In order to provide a minimum space of say 2 inches between the last total of a sheet and the first listed item of the following sheet, it will be necessary to determine the number of cards in the largest group and accordingly subtract that number from 84 in order to arrive at a new overflow point. Assuming that the number arrived at is 6 (including the total), the overflow point will therefore be on the 78th line. Ejection of sheet R at the 78th line is accordingly effected by the following plugging. In Fig. 13c the "7" hub of the "tens" dial is connected by means of a plugwire 355 to a "tens overflow" hub indicated as O. F. T. The "8" hub of the units dial is connected by means of a plugwire 356 to a units overflow hub indicated as O. F. U. Ejection by the dual feed device is caused by impulsing, with successive impulses, the space solenoid magnet SSM shown in Fig. 13d. Termination of the register strip ejection is effected by interrupting the impulses fed to the space solenoid magnet SSM, and this is accomplished by a sheet length means also controlled by the step up relays.

Referring again to Fig. 13c, the sheet length means is plugged to stop ejection when the 96th line is encountered by the following plugging: The "9" hub of the tens dial is connected by means of a plugwire 357 to a tens sheet length hub labeled S. L. T. The "6" hub of the units dial is plugged by means of a plugwire 358 to a units sheet length hub labeled S. L. U. The 96th line thereby is determined as the space between corresponding parts of two successive register sheets and it locates the first printing line on the register sheet.

The circuit pertaining to dual feed operations will now be described in accordance with the forms shown in Fig. 2. For each listing operation, the space solenoid SSM is energized by the following circuit. Referring to Fig. 13d, the circuit follows a path through line 101, wire 360, space solenoid magnet SSM, RD6b n/o, wire 361, RD17a n/c, RD18a n/c, RD21b n/o, CBD3 cam contact, wire 362 (Fig. 13c), and through the dual carriage switch DCS to line 100. In the circuit just traced the RD6b n/o contact (Fig. 13d) is now closed by virtue of the fact that the RD6 relay was energized during run-in operations. The RD21b n/o contacts are closed long enough to permit but a single pulse to pass therethrough to the space solenoid SSM and the manner in which RD21 is energized may be explained as follows: In Fig. 13d the circuit to RD21 begins with line 100 (Fig. 13c) and follows through the dual carriage switch DCS, wire 362, CBD4 (Fig. 13d), RD3c n/o, relay RD21 and wire 310 to line 101. A momentary holding circuit for RD21 is immediately established upon the closing of the RD21a contacts (Fig. 13d).

In the pickup circuit to RD21, the normally open contacts RD3c are closed by virtue of the following circuit: In Fig. 13b, on every printing cycle PM14 closes and the circuit begins with line 101, wire 363, RD3, wire 320, PM14 to switch S2 (Fig. 13c), RD5b n/o, and wire 364 to line 100.

The listing of each item continues and the space solenoid SSM will be energized for each list operation in the manner described. When a group change is detected, a normal carriage skipping operation is initiated thereby causing the bill form B (Fig. 2) to be spaced to the predetermined total line. During the skipping operation, card feeding and printing operations of the tabulator are suspended by virtue of skipping interlocks being effective at this time. The interlock contacts R36c and R35a (Fig. 13a) controlled by said interlock circuits, disable the pickup circuit for the auto start relay R11 and the auto total control relay R23. The machine idles until skipping is terminated whereupon the interlocks become effective to permit the tabulator to undergo a total taking cycle. During the above skipping operations of the carriage, dual feed operations are at a standstill because of the lack of printer closure of PM14 (Fig. 13b) and relay RD3 being deenergized, disables RD21 (Fig. 13d) which in turn disables the circuit to the space solenoid SSM.

During the total taking cycle, the space solenoid SSM is energized in the manner described, causing the total on the register sheet to appear immediately below the last previously printed item. After the printing of the total, there is shown to be an extra space which is selective and merely the equivalent of the normal downstroke spacing on total cycles under the control of PM10 and the tabulator switch SW3 (Fig. 13c). Following the total taking cycle the listing of each item of the following group is resumed and the control of the space solenoid SSM is effected in the manner already described.

During each listing and total taking cycle, other dual control circuits are operative to cause the line counting devices to be effective. As previously mentioned, the counting devices or stepping relays are caused to advance one position for each impulse to the units dial magnet UD. This impulse to the units dial magnet UD is traceable as follows: In Fig. 13d, the circuit follows a path through line 101, wire 360, units dial magnet UD, RD7b n/c, RD11a n/c, RD10a n/c, RD21b n/o, CBD3, wire 362, through the dual switch DCS (Fig. 13c) to line 100. On the tenth spacing operation the units dial is restored to zero, and a carry circuit causes the tens dial to advance from "0" to "1."

Before explaining the operations of the tenth spacing operation, certain preliminary circuits are established for the conditioning of the carry circuit which is to take place on the tenth spacing operation. One of these conditioning circuits is established by the closure of a units dial contact UDC (Fig. 13d) by the units dial mechanism immediately upon advance of the units dial from "0" to "1," to energize an RD8 relay. In Fig. 13d, the RD8 relay circuit is traceable as follows: Line 101, wire 366, RD8, units dial contact UDC, wire 367, wire 362, through the dual carriage switch DCS (Fig. 13c) to line 100.

Another conditioning circuit is established during the ninth spacing operation when the units dial arm makes contact with the ninth position (Fig. 13c) thereby permitting the energization of an RD7 (units carry) relay upon closure of the CBD2 cam contact. This circuit to pick up RD7 is traceable in Fig. 13c as follows: Line 101, wire 368, relay RD7, 9 spot on the units dial relay, units dial arm, CBD2, wire 362, and the dual carriage switch DCS to line 100. Upon closure of RD7a (Fig. 13d), a hold circuit for RD7H will be immediately established as follows: In Fig. 13d, the circuit follows a path through line 101, wire 366, relay RD7, RD7a n/o, CBD4, wire 362, dual carriage switch DCS (Fig. 13c) to line 100. Referring back to the RD7H relay in Fig. 13d, there is also shown a second parallel hold circuit as follows: Beginning with relay RD7H, RD7a n/o, RD7c n/o, RD8c n/o, wire 367 and wire 362, dual carriage switch DCS (Fig. 13c) to line 100.

On the tenth spacing operation the pulse ordinarily delivered to the units dial magnet UD is diverted to the tens dial magnet TD and the units dial return magnet UDR by virtue of the closure of the lower RD7b contacts. The circuit to the units dial return magnet UDR follows a path, in Fig. 13d, through line 101, wire 360, units dial return magnet UDR, RD2a n/o, wire 369, RD7b n/o, RD7a n/c, RD10a n/c, RD21b n/o, CBD3, wire 362, dual carriage switch DCS (Fig. 13c) to line 100. The circuit to the tens dial magnet TD (Fig. 13d) begins with line 101, wire 360, tens dial magnet TD, R19d n/c, RD5d n/o, through RD8a and from there to line 100 the circuit is the same as that traced for the units dial return magnet UDR. When the units dial is restored to zero, the dial contact UDC is opened to deenergize the RD8 relay, and in turn the RD8b contacts, upon opening, will deenergize the hold circuit for RD7H thereby conditioning the units dial relay UD for counting operations. For every 10 spacing pulses and units spacing operations the tens dial magnet TD is energized but once.

Listing and total printing operations on a given register sheet continue until the overflow point is reached whereupon preliminary dual eject control circuits are set up. The dual feed ejection of the register strip does not materialize until a carriage ejection of the bill form is initiated. Referring to Fig. 13c, the circuits set up when the overflow point (78th line) is reached are as follows: When the tens dial reaches 7, a circuit is effective to energize RD13 as follows: Line 101, dual carriage switch DCS, CBD1, tens dial, contact #7, plug hub #7, plugwire 355, O. F. T. hub, RD13P, wire 352 to line 101. Upon closure of RD13a contacts (Fig. 13g), a hold circuit for RD13H will be immediately established as follows: In Fig. 13g the circuit follows a path through line 101, wire 318, RD13H, RD13a n/o, RD14c n/c, wire 371, R9a n/o, R4b n/o to line 100. The closure of the RD13b contacts (Fig. 13c), permits the energization of RD12P relay when the units dial makes contact with the #8 contact as follows: Line 101, wire 368, RD12P, RD13b n/o, O. F. U. hub, plugwire 356, hub #8, units dial, CBD2, wire 362, and the dual carriage switch DCS to line 100. Upon closure of RD12b contacts (Fig. 13g) a hold circuit for RD12H is immediately established as follows: (Fig. 13g) Line 101, wire 318, RD12H, RD12b n/o, RD14c, n/c, wire 371, R9a n/o, R4b n/o to line 100. The closure of the RD12d contacts in Fig. 13c permits the energization of the RD10 eject control relay on condition that an auto carriage ejection (after total) has been set up. In view of the fact that a predetermined total skipping operation is initiated upon a change in group control, skipping circuits become effective to cause the automatic carriage to advance the bill form (Fig. 2) in the usual way to a predetermined total position. As previously explained, skipping interlocks become effective during skipping operations to suspend card feeding and printing operations. During the intervening idle machine cycles, the dual feed controls for the register sheet form R (Fig. 2) are at a standstill. When the predetermined point is encountered, the automatic carriage skipping operation comes to a halt whereupon the skipping interlocks are disabled to permit the printer to undergo a total printing cycle. After the total is printed, an "after total" automatic carriage ejection circuit becomes effective to cause ejection of the bill form. During the automatic carriage ejection, the dual carriage eject relay RD10 becomes effective to cause ejection of the register form R thereby presenting the second register sheet for printing on the first printing line. The register sheet part of dual ejection is a succession of line spacing actions controlled by the dual eject relay RD10.

Returning now to the pickup circuit for RD10, reference is again made to Fig. 13c where the circuit follows a path through line 101, wire 352, eject relay RD10P, RD12d n/o, CBD5, minor and intermediate relay contacts RD22a n/c, RD23a n/c, wire 325 (Fig. 13e) to post #32 and eventually to line 100 by the circuit devices previously described for the automatic carriage eject circuit. Upon closure of RD10b contacts (Fig. 13g), a hold circuit for RD10H is immediately established as follows: Line 101, wire 318, RD10H, RD10b n/o, RD14c n/c, wire 371, R9a n/o, R4b n/o to line 100. Closure of the RD10d contacts in Fig. 13d permits energization of the space solenoid SSM as follows: Line 101, wire 360, space solenoid magnet SSM, RD6b n/o, RD10d n/o, RD2b n/o, RD5c n/o, CBD3, wire 362 to dual switch DCS (Fig. 13c) to line 100. The RD2b contacts are closed by virtue of the fact that after run-in cycles, RD2 (Fig. 13c) is picked up by CBD2 and held by CBD4. The pickup of RD2 is as follows: (Fig. 13c) Line 101, wire 368, RD2P, RD1a n/o, CBD2, wire 362 and dual carriage switch DCS to line 100. In Fig. 13d, the RD2H circuit is as follows: Line 101, wire 366, RD2H, RD2a n/o, CBD4, wire 362, dual carriage switch DCS (Fig. 13c) to line 100.

During these dual spacing operations, printer operations are suspended by the normally closed RD10c contacts (Fig. 13a) being opened at this time. When finally the 96th line is encountered circuits will be established to disrupt the dual spacing operations and permit a resumption of printer operations. Before tracing the circuits established when the 96th line is encountered, a circuit is established when the 90th space is encountered as follows: (Fig. 13c) Line 101, wire 352, sheet length relay RD15P, S. L. T. hub, plugwire 357, "9" hub, tens dial, CBD1, dual switch DCS to line 100. Upon closure of RD15a n/o contacts (Fig. 13g), a hold circuit for RD15 will be immediately established as follows: Line 101, wire 318, RD15H, RD15a, RD14c n/c, wire 371, R9a n/o, R4b n/o to line 100. In Fig. 13c, the closure of RD15b contacts permits energization of the sheet length relay RD14p when the 96th line is encountered. The RD14p circuit follows a path through line 101, wire 368, RD14P, RD15b n/o, S. L. U. hub, plugwire 358, "6" hub on units dial, units dial, CBD2, wire 362, dual switch DCS to line 100. A hold circuit for RD14H (Fig. 13d) is immediately established upon closure of RD14b contacts as follows: In Fig. 13d, the circuit follows a path through line 101, wire 366, RD14H, RD14b n/o, CBD4, wire 362, dual carriage switch DCS (Fig. 13c) to line 100.

In Fig. 13g, the opening of the normally closed RD14c contacts causes the hold circuits for relays RD15H, RD12H, RD13H and RD10H to be deenergized. As soon as RD10H is deenergized, the RD10d contacts (Fig. 13d) open up to disrupt the circuit to the space solenoid SSM thereby terminating the dual eject operation.

Restoration of the units and tens dials to zero is accomplished in the following manner: The closure of contacts RD14a and RD14d (Fig. 13d) permits energization of the units dial return and tens dial return magnets UDR and TDR when CBD3 closes. The circuit for the units dial return magnet UDR follows a path through line 101, wire 366, units dial return magnet UDR, RD8a n/o, RD14d n/o, CBD3, wire 362, dual carriage switch DCS (Fig. 13c) to line 100. The circuit for the tens dial return magnet TDR follows a path through line 101 (Fig. 13d), wire 366, tens dial return magnet TDR, tens dial contact TDC, RD14a n/o, RD14d n/o, CBD3, wire 362, dual carriage switch DCS to line 100.

The foregoing section of the description is concerned with operations of the dual feed carriage as it applies to a particular application. The following section of the description explains other dual feed circuits which apply to an ejection initiated by a particular X or digit designation and a predetermined total skipping operation initiated by a change in group control.

The plugging employed for an ejection initiated by a digit or an X perforation in a card is as follows: The upper (control) brush UB plughub (Fig. 13c) is connected by means of a plugwire (not shown) to either the X or D digit eject hubs also shown in Fig. 13c. When, during a card feeding operation, a digit or an X is sensed by the upper brush UB, a circuit becomes effective to energize the pickup coil of an eject control relay RD9. Assuming that the X-Eject circuit is used, the circuit then follows a path through line 101 (Fig. 13c), wire 368, RD9P1, RD4a n/o, XRc contact n/o, X hub, plugwire to upper brush plug hub, upper brush UB, an X perforation in the card, contact roll, common brush, R2a n/c, CF17, wire 367, circuit breakers CB4, CB2 to line 100. Upon closure of the RD9a contacts (Fig. 13g) a hold circuit for RD9H is established through line 101 (Fig. 13g), wire 318, RD9H, RD9a n/o, RD14c n/c, wire 371, R9a n/o, R4b n/o to line 100. The closure of the RD9c contacts (Fig. 13c) permits energization of the eject control relay RD10P. Final energization of RD10P must await the effective operation of the ejecting circuits of the automatic carriage as explained earlier in this description.

In Fig. 13g, there is also shown a relay RD11 wired in parallel with relay RD9H. This relay is used to cancel the effects of the group control suppression relay R30 (Fig. 13g) by virtue of the fact that RD11a n/o contacts are wired in parallel with the normally closed R30c contacts. Cancellation of the effects of group control suppression is necessary when using an inverted type of form.

The plugging employed for predetermined total skipping operations is as follows: In Fig. 13b, the MINOR eject before total hub MB is connected by means of a plugwire (not shown) to a predetermined total (P. T.) hub in Fig. 13c. Upon change in group control a circuit becomes effective to energize a predetermined total relay RD16 in the following manner: Line 101 (Fig. 13c), wire 352, RD16P, RD12a n/c, P. T. hub, plugwire (not shown) to the MINOR eject before total hub MB (Fig. 13b), R10c n/o, to the MINOR class of total hub as a terminal, the circuit continuing through MINOR R61d n/o, CB22 to post #4 (Fig. 13c), circuit breakers CB4, CB2 to line 100. Upon closure of RD16b (Fig. 13g) a hold circuit for RD16H will be established as follows: Line 101, wire 318, RD16H, RD16b, RD12c n/o, R9a n/o, R4b n/o to wire 100.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine for printing in duplicate on a bill strip and a register strip, the bill strip being divided into forms for separate accounts and the register strip being divided into sheets receptive of a condensed record of a plurality of accounts, a feeding means for the bill strip including a line spacing means and a long feeding ejection means, means for operating said line spacing means as an incident to each printing operation, other means for controlling said line spacing means to skip spaces on a bill form, means for operating said ejection means as an incident to printing the last line of an account to feed the bill strip from form to form, a feeding device for the register strip including a line spacing mechanism and a solenoid for operating said mechanism, means for pulsing said solenoid for each printing operation, means under control of said feeding device for determining the length of a register sheet on the register strip, means under control of said feeding device for limiting the length of the printing area within each register sheet, means under control of said limiting means for initiating and repeating operation of said pulsing means to effect a skipping operation to carry the register strip from sheet to sheet, and means under control of said determining means for stopping said pulsing means when the first print line position is reached on the incoming register sheet.

2. In a machine for recording in duplicate on a bill strip and a register strip, the bill strip being divided into forms for separate accounts and the register being divided into sheets receptive of a condensed record of a plurality of accounts, a feeding means for the bill strip including a line spacing means and a long feeding ejection means, means for operating said line spacing means as an incident to each recording operation, other means for controlling said line spacing means to skip spaces on a bill form, means for operating said ejection means as an incident to printing the last line of an account to feed the bill strip from form to form, a feeding device for the register strip including a line spacing mechanism, a solenoid for operating the line spacing mechanism, and a one way ratchet clutch between the solenoid and the line spacing mechanism, means for pulsing said solenoid for each recording operation, two stepping switch relays, means for controlling said stepping switch relays to step in synchronism with the line spacing mechanism of the register strip, one of said relays having ten units order switch positions and the other of said relays having ten tens order switch positions, said positions being pluggable to be selective of multidenominational representations of the numbers of lines comprising the length of a register sheet and the length of the printing area thereon, a control relay for initiating operation of said pulsing means to operate said solenoid to skip from sheet to sheet, means for plugging said relay to selected switch positions on said stepping relays, other relay means for stopping said skipping operation of said solenoid, and means for plugging said other relay means to selected switch positions on said stepping relays to determine the stopping position of said skipping operation and thereby determine the length of each register sheet.

3. In a machine for printing in duplicate on a bill strip and a register strip, said strips having marginal pin feed holes, the bill trip being divided into forms for separate accounts and the register strip being divided into sheets receptive of a condensed record of a plurality of accounts, two sets of pin feed drive wheels for said strips, a feeding means for the bill strip including a line spacing means and a long feeding ejection means and gear connections to one of said sets of pin feed drive wheels, means for operating said line spacing means as an incident to each printing operation, other means for controlling said line spacing means to skip spaces on a bill form, means for operating said ejection means as an incident to printing the last line of an account to feed the bill strip from form to form, a feeding device for the register strip including a line spacing mechanism, a solenoid for operating said mechanism, and gear connections to one of said sets of pin feed drive wheels, means for pulsing said solenoid for each printing operation, means under control of said feeding device for determining the length of a register sheet on the register strip, means under control of said feeding device for limiting the length of the printing area within each register sheet, means under control of said limiting means for initiating and repeating operation of said pulsing means to effect a skipping operation to carry the register strip from sheet to sheet, and means under control of said determining means for stopping said pulsing means when the first print line position is reached on a new register sheet.

4. In a machine for recording in duplicate on a bill strip and a register strip, the bill strip being divided into forms for individual accounts and the register strip being divided into sheets receptive of a condensed record of a plurality of accounts, means for printing data of a plurality of accounts on said strips, a feeding means for the bill strip including a line spacing means and a long feeding ejection means, means for operating said line spacing means as an incident to each printing operation, other means for controlling said line spacing means to skip spaces on a bill form, means for operating said ejection means as an incident to printing the last line of an account to feed the bill strip from form to form, a feeding device for the register strip including a line spacing mechanism, a solenoid for operating said mechanism, means for pulsing said solenoid for each printing operation, means under control of said feeding device for determining the length of a register sheet on the register strip, means under control of said feeding device for limiting the length of the printing area within each register sheet, means under control of said limiting means for initiating and repeating operation of said pulsing means to effect a skipping operation to carry the register strip from sheet to sheet, means under control of said determining means for stopping said pulsing means when the first print line position is reached on a new register sheet, and means under control of said initiating and repeating means for disabling operation of said printing means while skipping from sheet to sheet.

5. In a machine controlled by records for printing groups of data on a register strip, said records being divided into groups of related accounts and said strip being divided into sheets each proportioned to receive a predetermined number of lines of data relating to a plurality of accounts, means for sensing indicia on said records, means under control of said sensing means for printing on said strip, a feeding means for said strip, line spacing devices cooperating with said feeding means for feeding the strip for every printing operation, means for detecting the end of records associated with said plurality of accounts, means under control of said detecting means for initiating successive operations of said line spacing devices, a pair of adjustable sheet length step switches advanced by said line spacing devices, each of said switches having ten pluggable line representing positions, one of said switches being representative of the tens order of line numbers and controlled to advance one step for each set of ten steps of advance of the other switch which is operated directly by the line spacing devices and representative of the units order of line numbers, electrical control means for stopping said line spacing devices, and pluggable connections between selected switch positions and said control means for making said control means effective to stop said successive operations of said line spacing devices when the desired length of sheet is reached.

6. In a machine for recording on a register strip, said strip being divided into sheets receptive of a condensed record of a plurality of accounts, a feeding device for the register strip including line spacing gearing, a cam, a solenoid for operating said cam, and a ratchet drive between said cam and said line spacing gearing, means for pulsing said solenoid for each recording operation, means under control of said feeding device for determining the length of a register sheet on the register strip, means under control of said feeding device for limiting the length of the printing area within each register sheet, means under control of said limiting means for initiating and repeating operation of said pulsing means to effect a skipping operation to carry the register strip from sheet to sheet, and means under control of said determining means for stopping said pulsing means when the first print line is reached on a succeeding register sheet.

7. In a machine controlled by records for printing data on a register strip, said records being divided into groups and said strip being divided into sheets, each sheet designed to hold the data relating to a predetermined number of lines of data of a plurality of groups, means for sensing indicia on said records, means under control of said sensing means for printing on said strip, a strip feed means, line spacing means cooperating with said feed means for feeding the strip for every printing operation, means for initiating successive operations of said line spacing means to skip the unprinted portion of a sheet, means advanced by said spacing means for stopping said spacing means after the passage of the strip from sheet to sheet, a step switch means, means under control of said line spacing means for operating said switch means to step it in synchronism with the spacing of the sheet and thereby count lines already used for printing on a sheet, means under control of said switch means for operating said initiating means, means under control of said switch means for suspending operation of said record sensing means while skipping, means for restoring said step switch means, and means under control of said switch means when it has counted said predetermined number of lines and the unprinted sheet portion for initiating operation of said switch restoring means to restore the switch means and for controlling said suspending means to restart record sensing.

8. A machine of the kind set forth in claim 1 wherein additional control is provided in the form of a means under control of said bill strip ejection means for preventing register strip skipping operation of said pulsing means by said initiating and repeating means until ejection of a bill form is initiated.

JONAS E. DAYGER.
ORVILLE B. SHAFER.
ASA N. MILLER.

REFERENCES CITED

The following references are of record in the file of this patent:

UNITED STATES PATENTS

| Number | Name | Date |
| --- | --- | --- |
| 2,138,646 | Scharr | Nov. 29, 1938 |
| 2,348,059 | Daly | May 2, 1944 |